United States Patent
Ki et al.

(10) Patent No.: US 11,970,613 B2
(45) Date of Patent: *Apr. 30, 2024

(54) POLYMER FILM

(71) Applicant: SK microworks Co., Ltd., Gyeonggi-do (KR)

(72) Inventors: Jung Hee Ki, Gyeonggi-do (KR); Sunhwan Kim, Incheon (KR); Sang Hun Choi, Seoul (KR); Dae Seong Oh, Seoul (KR); Han Jun Kim, Gyeonggi-do (KR); Jin Woo Lee, Seoul (KR); Dong Jin Lim, Gyeonggi-do (KR)

(73) Assignee: SK MICROWORKS CO., LTD., Gyeonggi-do (KR)

( * ) Notice: Subject to any disclaimer, the term of this patent is extended or adjusted under 35 U.S.C. 154(b) by 876 days.

This patent is subject to a terminal disclaimer.

(21) Appl. No.: 16/913,245

(22) Filed: Jun. 26, 2020

(65) Prior Publication Data

US 2020/0407557 A1     Dec. 31, 2020

(30) Foreign Application Priority Data

Jun. 28, 2019 (KR) .................. 10-2019-0078286
Nov. 15, 2019 (KR) .................. 10-2019-0146804
Dec. 11, 2019 (KR) .................. 10-2019-0164668
Mar. 24, 2020 (KR) .................. 10-2020-0035707

(51) Int. Cl.
| C08L 79/08 | (2006.01) |
| C08G 73/10 | (2006.01) |
| C08K 5/09  | (2006.01) |
| C09K 11/02 | (2006.01) |

(52) U.S. Cl.
CPC .......... *C08L 79/08* (2013.01); *C08G 73/1007* (2013.01); *C08K 5/09* (2013.01); *C08L 2201/10* (2013.01); *C08L 2203/16* (2013.01); *C09K 11/025* (2013.01)

(58) Field of Classification Search
CPC .. C08L 79/08; C08L 2201/10; C08L 2203/16; C08G 73/1007; C08K 5/09
See application file for complete search history.

(56) References Cited

U.S. PATENT DOCUMENTS 10,151,977 B2 * 12/2018 Tsutsumi ............... G03F 7/038
2019/0202988 A1    7/2019 Abiko et al.

FOREIGN PATENT DOCUMENTS

| CN | 109071811 A | 12/2018 | |
| JP | 2019099626 A * | 6/2019 | ............... C08J 5/18 |
| KR | 10-2008-0106367 A | 12/2008 | |
| KR | 10-2017-0089585 A | 8/2017 | |
| KR | 101890898 B1 * | 8/2018 | ......... C08G 73/1039 |
| TW | 201249901 A1 | 12/2012 | |
| TW | 201734090 A | 10/2017 | |
| TW | 201819470 A | 6/2018 | |
| TW | 201902990 A | 1/2019 | |
| WO | WO 2017191830 A1 * | 11/2017 | ............. C08G 73/10 |

OTHER PUBLICATIONS

Machine translation of KR 101890898 B1 to Oh et al.; published Aug. 22, 2018 (Year: 2018).*
Machine translation of JP 2019099626 A to Kihara et al.; published Jun. 24, 2019 (Year: 2019).*
Office Action for the Chinese Patent Application No. 202010611676.X issued by the Chinese Patent Office dated Sep. 7, 2022.
Office Action issued by the Taiwanese Patent Office dated Dec. 30, 2020.
Office Action issued by the Korean Patent Office dated Jun. 21, 2021.

* cited by examiner

*Primary Examiner* — Jane L Stanley
(74) *Attorney, Agent, or Firm* — IP & T GROUP LLP

(57) ABSTRACT

Embodiments relate to a polymer film. The polymer film comprises a polymer resin selected from the group consisting of a polyamide-based resin and a polyimide-based resin and has a haze ($HZ_0$) before autoclave treatment of 3% or less and a $\Delta HZ_{24}$ represented by Equation 1a of 500% or less.

14 Claims, 3 Drawing Sheets

POLYMER FILM

The present application claims priority of Korean patent application numbers 10-2019-0078286 filed on Jun. 28, 2019, 10-2019-0146804 filed on Nov. 15, 2019, 10-2019-0164668 filed on Dec. 11, 2019, and 10-2020-0035707 filed on Mar. 24, 2020. The disclosure of each of the foregoing applications is incorporated herein by reference in its entirety.

TECHNICAL FIELD

Embodiments relate to a polymer film that is excellent in static flexural characteristics, folding characteristics, and transparency and that maintains excellent optical properties and mechanical properties at high temperature and high humidity.

BACKGROUND ART OF THE INVENTION

Polyimide-based resins such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyimide is used in various fields. For example, polyimide is made in the form of a powder and used as a coating for a metal or a magnetic wire. It is mixed with other additives depending on the applications thereof. In addition, polyimide is used together with a fluoropolymer as a painter for decoration and corrosion prevention. It also plays a role of bonding a fluoropolymer to a metal substrate. In addition, polyimide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyimide has been developed in the form of a film, which is less expensive and has excellent optical, mechanical, and thermal characteristics. Such a polyimide-based film may be applied to display materials for organic light-emitting diodes (OLEDs) or liquid crystal displays (LCDs), and the like, and to antireflection films, compensation films, and retardation films if retardation properties are implemented.

Such a polyimide-based film has a problem that a barrier layer is formed as its physical properties are deteriorated in a high-temperature and high-humidity environment. In order to solve this problem, additives such as clay that are resistant to moisture are introduced, in which case the optical properties or compatibility may be deteriorated.

In addition, such a polyimide-based film has a problem that its restorability is poor when it has been folded for a long period of time. When the restorability is poor, there may arise a problem that the screen is distorted when the film is applied to a foldable display and the like.

With the active development of foldable displays, flexible displays, and the like in recent years, there has been a continuous demand for research on the development of a film that is excellent in the characteristic to be restored to its original state as much as possible when it has been folded for a long period of time and then unfolded and the characteristic to withstand repeated folding; and a film that has excellent mechanical properties and optical properties while it maintains excellent physical properties in a high-temperature and high-humidity environment.

DISCLOSURE OF THE INVENTION

Problem to be Solved

Embodiments aim to provide a polymer film that is excellent in static flexural characteristics, folding characteristics, and transparency and that maintains excellent optical properties and mechanical properties at high temperature and high humidity.

Solution to the Problem

The polymer film according to an embodiment comprises a polymer resin selected from the group consisting of a polyamide-based resin and a polyimide-based resin and has a haze ($HZ_0$) before autoclave treatment of 3% or less and a $\Delta HZ_{24}$ represented by the following Equation 1a of 500% or less:

$$\Delta HZ_{24}(\%) = \frac{|HZ_{24} - HZ_0|}{HZ_0} \times 100 \quad \text{[Equation 1a]}$$

In Equation 1a, $HZ_0$ refers to the haze before the film is treated in an autoclave, $HZ_{24}$ refers to the haze after the film is treated in an autoclave, and the autoclave treatment means that an autoclave is filled with water and a film is treated therein at a temperature of 120° C. and a pressure of 1.2 atm for 24 hours.

The polymer film according to another embodiment comprises a polymer resin selected from the group consisting of a polyamide-based resin and a polyimide-based resin and has a modulus ($MO_0$) before autoclave treatment of 5 GPa or more and a $\Delta TS_{24}$ represented by the following Equation 1b of 15% or less:

$$\Delta TS_{24}(\%) = \frac{|TS_{24} - TS_0|}{TS_0} \times 100 \quad \text{[Equation 1b]}$$

In Equation 1b, $TS_0$ refers to the modulus before the film is treated in an autoclave, $TS_{24}$ refers to the modulus after the film is treated in an autoclave, and the autoclave treatment means that an autoclave is filled with water and a film is treated therein at a temperature of 120° C. and a pressure of 1.2 atm for 24 hours.

The polymer film according to still another embodiment comprises a polymer resin selected from the group consisting of a polyamide-based resin and a polyimide-based resin; and butanoic acid.

Advantageous Effects of the Invention

The polymer film according to an embodiment not only has excellent static flexural characteristics, optical properties, and mechanical properties, but also can maintain excellent optical properties and mechanical properties even under the severe conditions of high temperature and high humidity.

In addition, the polymer film according to an embodiment is excellent in the restorability when it has been folded for a long period of time and then returns to the unfolded state by releasing the force applied to the film. Thus, it can provide a uniform screen state when applied to a foldable display, a flexible display, and the like.

Further, the polymer film according to an embodiment has excellent folding characteristics, so that it can be advantageously applied to a cover window for a display device and a foldable display device, a rollable display device, or a flexible displace device.

DETAILED DESCRIPTION FOR CARRYING OUT THE INVENTION

Figure 1:
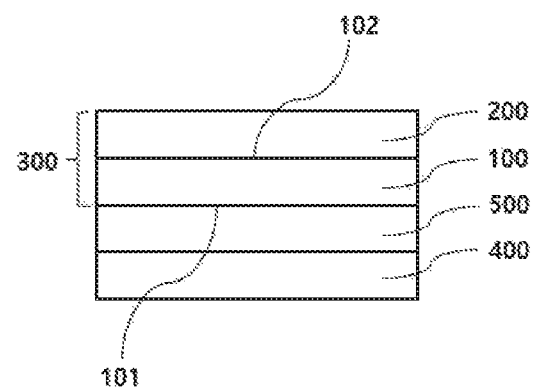
FIG. 1 is a cross-sectional view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polymer Film

Embodiments provide a polymer film that is excellent in static flexural characteristics, folding characteristics, optical properties, and mechanical properties and that maintains excellent optical properties and mechanical properties at high temperature and high humidity.

The polymer film according to an embodiment comprises a polymer resin selected from the group consisting of a polyamide-based resin and a polyimide-based resin.

The polymer film has a haze ($HZ_0$) of 3% or less before autoclave treatment.

Specifically, the haze ($HZ_0$) of the polymer film before autoclave treatment may be 2.5% or less, 2.0% or less, 1.5% or less, 1.0% or less, 0.8% or less, or 0.6% or less, but it is not limited thereto.

The polymer film has a $\Delta HZ_{24}$ value represented by the following Equation 1a of 500% or less:

$$\Delta HZ_{24}(\%) = \frac{|HZ_{24} - HZ_0|}{HZ_0} \times 100 \qquad \text{[Equation 1a]}$$

In Equation 1a, $HZ_0$ refers to the haze before the film is treated in an autoclave, $HZ_{24}$ refers to the haze after the film is treated in an autoclave, and the autoclave treatment means that an autoclave is filled with water and a film is treated therein at a temperature of 120° C. and a pressure of 1.2 atm for 24 hours. The film is placed in the autoclave, it is not immersed in the water, and it may be treated by vapor generated by the water.

Specifically, the $\Delta HZ_{24}$ value of the polymer film presented by the above Equation 1a may be 400% or less, 300% or less, 250% or less, or 200% or less, but it is not limited thereto.

If the polymer film has a haze ($HZ_0$) before the autoclave treatment and a $\Delta HZ_{24}$ represented by the above Equation 1a within the above ranges, the film may have excellent durability, in particular, little changes in the optical properties, even under the severe conditions of high temperature and high humidity. By virtue of these characteristics, it can be advantageously applied to a front panel for a display and a display device.

The polymer film has a yellow index ($YI_0$) before the autoclave treatment of 3 or less.

Specifically, the yellow index ($YI_0$) of the polymer film before the autoclave treatment may be 2.8 or less, or 2.7% or less, but it is not limited thereto.

The polymer film has an in-plane retardation ($Ro_0$) before the autoclave treatment of 180 nm or less.

Specifically, the in-plane retardation ($Ro_0$) of the polymer film before the autoclave treatment may be 170 nm or less, 160 nm or less, 150 nm or less, 10 nm to 160 nm, 20 nm to 160 nm, 50 nm to 160 nm, or 80 nm to 150 nm, but it is not limited thereto.

The polymer film has a $\Delta YI_{24}$ value represented by the following Equation 2a of 30% or less:

$$\Delta YI_{24}(\%) = \frac{|YI_{24} - YI_0|}{YI_0} \times 100 \qquad \text{[Equation 2a]}$$

In Equation 2a, $YI_0$ refers to the yellow index before the film is treated in an autoclave, $YI_{24}$ refers to the yellow index after the film is treated in an autoclave, and the autoclave treatment means that an autoclave is filled with water and a film is treated therein at a temperature of 120° C. and a pressure of 1.2 atm for 24 hours. The film is placed in the autoclave, it is not immersed in the water, and it may be treated by vapor generated by the water.

Specifically, the $\Delta YI_{24}$ value of the polymer film presented by the above Equation 2a may be 25% or less, 20% or less, 15% or less, 10% or less, or 5% or less, but it is not limited thereto.

The polymer film has a $\Delta Ro_{24}$ value represented by the following Equation 3a of 8% or less:

$$\Delta Ro_{24}(\%) = \frac{|Ro_{24} - Ro_0|}{Ro_0} \times 100 \qquad \text{[Equation 3a]}$$

In Equation 3a, $Ro_0$ refers to the in-plane retardation before the film is treated in an autoclave, $Ro_{24}$ refers to the in-plane retardation after the film is treated in an autoclave, and the autoclave treatment means that an autoclave is filled with water and a film is treated therein at a temperature of 120° C. and a pressure of 1.2 atm for 24 hours. The film is placed in the autoclave, it is not immersed in the water, and it may be treated by vapor generated by the water.

Specifically, the $\Delta Ro_{24}$ value of the polymer film represented by the above Equation 3a may be 7% or less, 6% or less, 5% or less, or 4.8% or less, but it is not limited thereto.

The polymer film has a haze ($HZ_{24}$) of 3% or less after it is treated in an autoclave for 24 hours. The autoclave treatment means that an autoclave is filled with water and a film is treated therein at a temperature of 120° C. and a pressure of 1.2 atm for 24 hours. The film is placed in the autoclave, it is not immersed in the water, and it may be treated by vapor generated by the water.

Specifically, the haze ($HZ_{24}$) of the polymer film after it is treated in an autoclave for 24 hours may be 2.5% or less, 2.0% or less, 1.8% or less, or 1.6% or less, but it is not limited thereto.

The polymer film has a yellow index ($YI_{24}$) of 3 or less after it is treated in an autoclave for 24 hours. The autoclave treatment means that an autoclave is filled with water and a film is treated therein at a temperature of 120° C. and a pressure of 1.2 atm for 24 hours. The film is placed in the autoclave, it is not immersed in the water, and it may be treated by vapor generated by the water.

Specifically, the yellow index ($YI_{24}$) of the polymer film after it is treated in an autoclave for 24 hours may be 2.8 or less, or 2.7 or less, but it is not limited thereto.

In particular, if the yellow index ($YI_{24}$) of the polymer film after it is treated in an autoclave for 24 hours exceeds the above range, the transparency is deteriorated in a high-temperature and high-humidity environment, so that the film is unsuitable for application to a front panel or a display device. Further, since the screen appears bluish and dark, there arises a problem that more power is consumed to maintain a brighter screen to compensate for this.

The polymer film has an in-plane retardation ($Ro_{24}$) of 180 nm or less after it is treated in an autoclave for 24 hours. The autoclave treatment means that an autoclave is filled with water and a film is treated therein at a temperature of 120° C. and a pressure of 1.2 atm for 24 hours. The film is placed in the autoclave, it is not immersed in the water, and it may be treated by vapor generated by the water.

Specifically, the in-plane retardation ($Ro_{24}$) of the polymer film after it is treated in an autoclave for 24 hours may be 160 nm or less, 150 nm or less, 145 nm or less, 20 nm to 160 nm, 40 nm to 150 nm, or 60 nm to 145 nm, but it is not limited thereto.

In particular, since the polymer film according to an embodiment has a low $\Delta HZ_{24}$ value, a low $\Delta YI_{24}$ value, and a low $\Delta Ro_{24}$ value, it can maintain excellent optical properties under the severe conditions of high temperature and high humidity. Thus, it can be advantageously applied to a display device. Even when the display device to which the polymer film is applied is used in an area of high humidity or high temperature, it is still possible to achieve a transparent and clean screen.

Further, since the polymer film according to an embodiment has $HZ_0$, $YI_0$, $Ro_0$, $HZ_{24}$, $YI_{24}$, $Ro_{24}$, $\Delta HZ_{24}$, $\Delta YI_{24}$, and $\Delta Ro_{24}$ values within the above ranges, it is possible to achieve not only clean optical properties but also excellent folding characteristics. Thus, it can be advantageously applied to a foldable display device or a flexible displace device.

The polymer film has a tensile strength ($TS_0$) before the autoclave treatment of 20 kgf/mm² or more.

Specifically, the tensile strength ($TS_0$) of the polymer film before the autoclave treatment is 20 kgf/mm² to 35 kgf/mm². Alternatively, the tensile strength ($TS_0$) of the polymer film before the autoclave treatment may be 21 kgf/mm² or more, but it is not limited thereto.

The polymer film has an elongation at break ($EL_0$) before the autoclave treatment of 15% or more.

Specifically, the elongation at break ($EL_0$) of the polymer film before the autoclave treatment is 15% to 40%. Alternatively, the elongation at break ($EL_0$) of the polymer film before the autoclave treatment may be 17% or more, 18% or more, 19% or more, or 20% or more, but it is not limited thereto.

The polymer film has a modulus ($MO_0$) before the autoclave treatment of 5.0 GPa or more.

Specifically, the modulus ($MO_0$) of the polymer film before the autoclave treatment is 5 GPa to 10 GPa. Alternatively, the modulus ($MO_0$) of the polymer film before the autoclave treatment may be 5.2 GPa or more, 5.3 GPa or more, or 5.5 GPa or more, but it is not limited thereto.

The polymer film has a $\Delta TS_{24}$ value represented by the following Equation 1b of 15% or less.

$$\Delta TS_{24}(\%) = \frac{|TS_{24} - TS_0|}{TS_0} \times 100 \qquad \text{[Equation 1b]}$$

In Equation 1b, $TS_0$ refers to the tensile strength before the film is treated in an autoclave, $TS_{24}$ refers to the tensile strength after the film is treated in an autoclave, and the autoclave treatment means that an autoclave is filled with water and a film is treated therein at a temperature of 120°

C. and a pressure of 1.2 atm for 24 hours. The film is placed in the autoclave, it is not immersed in the water, and it may be treated by vapor generated by the water.

Specifically, the $TS_{24}$ is 20 kgf/mm$^2$ or more.

In addition, the $TS_{24}$ of the polymer film may be 12% or less, 10% or less, or 8.5% or less, but it is not limited thereto.

The polymer film has a $\Delta EL_{24}$ value represented by the following Equation 2b of 30% or less.

$$\Delta EL_{24}(\%) = \frac{|EL_{24} - EL_0|}{EL_0} \times 100 \qquad \text{[Equation 2b]}$$

In Equation 2b, $EL_0$ refers to the elongation at break before the film is treated in an autoclave, $EL_{24}$ refers to the elongation at break after the film is treated in an autoclave, and the autoclave treatment means that an autoclave is filled with water and a film is treated therein at a temperature of 120° C. and a pressure of 1.2 atm for 24 hours. The film is placed in the autoclave, it is not immersed in the water, and it may be treated by vapor generated by the water.

Specifically, the $EL_{24}$ is 15% or more. Alternatively, the $EL_{24}$ may be 17% or more, or 20% or more, but it is not limited thereto.

In addition, the $EL_{24}$ value of the polymer film may be 28% or less, or 25% or less, but it is not limited thereto.

The polymer film has a $\Delta MO_{24}$ value represented by the following Equation 3b of 15% or less.

$$\Delta MO_{24}(\%) = \frac{|MO_{24} - MO_0|}{MO_0} \times 100 \qquad \text{[Equation 3b]}$$

In Equation 3b, $MO_0$ refers to the modulus before the film is treated in an autoclave, $MO_{24}$ refers to the modulus after the film is treated in an autoclave, and the autoclave treatment means that an autoclave is filled with water and a film is treated therein at a temperature of 120° C. and a pressure of 1.2 atm for 24 hours. The film is placed in the autoclave, it is not immersed in the water, and it may be treated by vapor generated by the water.

Specifically, the $MO_{24}$ is 15% or more. Alternatively, the $MO_{24}$ may be 5 GPa or more, 5.1 GPa or more, 5.5 GPa, or 6.0 GPa or more, but it is not limited thereto.

In addition, the $MO_{24}$ value of the polymer film may be 12% or less, or 10% or less, but it is not limited thereto.

The polymer film has a $\Delta SUM_{24}$ value of 60% or less. Here, the $\Delta SUM_{24}$ value is a value that represents the sum of $\Delta TS_{24}$, $\Delta EL_{24}$, and $\Delta MO_{24}$.

Specifically, the $\Delta SUM_{24}$ value of the polymer film may be 50% or less, 40% or less, or 35% or less, but it is not limited thereto.

Since the polymer film has $\Delta TS_{24}$, $\Delta EL_{24}$, $\Delta MO_{24}$, and $\Delta SUM_{24}$ values satisfying the above ranges, the film has excellent durability even at high temperature and high humidity and almost no deformation of physical properties. Thus, it can be advantageously applied to a front panel and a display device.

The polymer film has a $\Delta TS_{72}$ value represented by the following Equation 4b of 60% or less.

$$\Delta TS_{72}(\%) = \frac{|TS_{72} - TS_0|}{TS_0} \times 100 \qquad \text{[Equation 4b]}$$

In Equation 4b, $TS_0$ refers to the tensile strength before the film is treated in an autoclave, $TS_{72}$ refers to the tensile strength after the film is treated in an autoclave, and the autoclave treatment means that an autoclave is filled with water and a film is treated therein at a temperature of 120° C. and a pressure of 1.2 atm for 72 hours. The film is placed in the autoclave, it is not immersed in the water, and it may be treated by vapor generated by the water.

Specifically, the $TS_{72}$ is 5 kgf/mm$^2$ or more, 8 kgf/mm$^2$ or more, or 9 kgf/mm$^2$ or more.

In addition, the $TS_{72}$ value of the polymer film may be 50% or less, 40% or less, or 30% or less, but it is not limited thereto.

The polymer film has a $\Delta EL_{72}$ value represented by the following Equation 5b of 50% or less.

$$\Delta EL_{72}(\%) = \frac{|EL_{72} - EL_0|}{EL_0} \times 100 \qquad \text{[Equation 5b]}$$

In Equation 5b, $EL_0$ refers to the elongation at break before the film is treated in an autoclave, $EL_{72}$ refers to the elongation at break after the film is treated in an autoclave, and the autoclave treatment means that an autoclave is filled with water and a film is treated therein at a temperature of 120° C. and a pressure of 1.2 atm for 72 hours. The film is placed in the autoclave, it is not immersed in the water, and it may be treated by vapor generated by the water.

Specifically, the $EL_{72}$ value is 8% or more, 10% or more, or 12% or more.

In addition, the $\Delta EL_{72}$ value of the polymer film may be 45% or less, or 40% or less, but it is not limited thereto.

The polymer film has a $\Delta MO_{72}$ value represented by the following Equation 6b of 60% or less.

$$\Delta MO_{72}(\%) = \frac{|MO_{72} - MO_0|}{MO_0} \times 100 \qquad \text{[Equation 6b]}$$

In Equation 6b, $MO_0$ refers to the modulus before the film is treated in an autoclave, $MO_{72}$ refers to the modulus after the film is treated in an autoclave, and the autoclave treatment means that an autoclave is filled with water and a film is treated therein at a temperature of 120° C. and a pressure of 1.2 atm for 72 hours. The film is placed in the autoclave, it is not immersed in the water, and it may be treated by vapor generated by the water.

Specifically, the $MO_{72}$ value is 2 GPa or more, or 2.5 GPa or more.

In addition, the $\Delta MO_{72}$ value of the polymer film may be 50% or less, 40% or less, 30% or less, or 20% or less, but it is not limited thereto.

The $\Delta SUM_{72}$ value of the polymer film is 160% or less. Here, the $\Delta SUM_{72}$ value is a value that represents the sum of $\Delta TS_2$, $\Delta EL_{72}$, and $\Delta MO_{72}$.

Specifically, the $\Delta SUM_{72}$ value of the polymer film may be 150% or less, 120% or less, 100% or less, or 90% or less, but it is not limited thereto.

Since the polymer film has $\Delta TS_{72}$, $\Delta EL_2$, $\Delta MO_{72}$, and $\Delta SUM_{72}$ values satisfying the above ranges, the film has excellent durability even at high temperature and high humidity and almost no deformation of physical properties. Thus, it can be advantageously applied to a front panel and a display device.

When the polymer film according to an embodiment based on a thickness of 50 μm is folded to have a radius of curvature of 3 mm, the number of folding before the fracture is 100,000 or more.

The number of folding counts one when the film is folded to have a radius of curvature of 3 mm and then unfolded.

As the number of folding of the polymer film satisfies the above range, it can be advantageously applied to a foldable display device or a flexible display device.

When the polymer film according to another embodiment based on a thickness of 50 μm is folded to have a radius of curvature of 2 mm, the number of folding before the fracture is 200,000 or more.

The number of folding counts one when the film is folded to have a radius of curvature of 2 mm and then unfolded.

The polymer film according to an embodiment has a content of the residual solvent therein of 2,500 ppm or less or 1,200 ppm or less.

For example, the content of the residual solvent may be 2,200 ppm or less, 2,000 ppm or less, 1,800 ppm or less, 1,500 ppm or less, 1,000 ppm or less, 800 ppm or less, 500 ppm or less, 1 ppm to 1,000 ppm, 1 ppm to 800 ppm, 1 ppm to 500 ppm, 5 ppm to 1,000 ppm, 10 ppm to 1,000 ppm, or 20 ppm to 1,000 ppm, but it is not limited thereto.

The content of residual solvent refers to the amount of solvents that are not volatilized during the film production and remains in the film finally produced.

If the content of the residual solvent in the polymer film exceeds the above range, the durability and optical properties of the film under the conditions of high temperature and high humidity may be deteriorated, which, in particular, may have an impact on the subsequent processing of the film. Specifically, if the content of the residual solvent exceeds the above range, the hydrolysis of the film is expedited, resulting in a deterioration in the mechanical properties or the optical properties. In addition, if the content of the residual solvent in the polymer film exceeds the above range, the durability of the film may be deteriorated, which may have an impact on the static flexural characteristics and folding characteristics as described above.

The polymer film according to an embodiment has an IS value represented by the following Equation 7 of 5 to 160.

$$IS = IM - \frac{RS}{10} \qquad \text{[Equation 7]}$$

In Equation 7, IM stands for the number of moles of the imide repeat unit when the total number of moles of the imide repeat unit and the amide repeat unit in the film is 100; and RS stands for the content (ppm) of the residual solvent in the film.

For example, the IS value may be 5 to 150, 10 to 150, 30 to 150, 50 to 150, 5 to 80, 5 to 60, or 5 to 50, but it is not limited thereto.

If the IS value of the polymer film satisfies the above range, the film can have excellent optical properties and durability even after treatment under the severe conditions of high temperature and high humidity and have excellent folding characteristics.

In particular, if the above range is exceeded since the imide content (IM) is high or the content of the residual solvent (RS) is high, the long-term durability of the film is rapidly deteriorated. Specifically, if the imide content is too high and the amide content is thus relatively reduced, the hygroscopicity of the film decreases, so that it may have vulnerable properties under high humidity conditions.

The polymer film has a CT value represented by the following Equation 8 of 10 or less.

$$CT = \frac{|HZ_{24} - HZ_0|}{HZ_0} \times \frac{Ro_0}{100 \text{ nm}} \qquad \text{[Equation 8]}$$

In Equation 8, $HZ_0$ refers to the haze before the film is treated in an autoclave, $HZ_{24}$ refers to the haze after the film is treated in an autoclave, and the autoclave treatment means that an autoclave is filled with water and a film is treated therein at a temperature of 120° C. and a pressure of 1.2 atm for 24 hours. The film is placed in the autoclave, it is not immersed in the water, and it may be treated by vapor generated by the water.

In addition, $Ro_0$ refers to the in-plane retardation before the film is treated in an autoclave.

CT may be an index indicating the thermal resistance/humidity resistance that reflects the crystallinity. The higher the crystallinity of the polymer film, the lower the $\Delta HZ_{24}$ may be. That is, the higher the crystallinity of the polymer film, the higher the thermal resistance/humidity resistance of the polymer film. The higher the crystallinity of the polymer film, the higher the in-plane retardation ($Ro_0$) and the lower the optical properties of the polymer film may be.

As the polymer film is prepared with an appropriate composition in an appropriate process, it may have enhanced optical properties and enhanced thermal resistance/humidity resistance. For example, the polymer film is prepared with a relatively high amide content, a low content of the residual solvent, such additives as butanoic acid, and in an appropriate process such as a drying step and a thermal treatment step. Thus, the polymer film can lower the $\Delta HZ_{24}$ simultaneously lowering the in-plane retardation.

Thus, the CT value may be 10 or less. The CT may be 8 or less. The CT may be 6 or less. The CT may be 4 or less. The CT may be 4 or less. The CT may be 3 or less. The CT may be 2 or less.

Since the polymer film has a low CT value, it may have enhanced thermal resistance/humidity resistance and enhanced optical properties. Thus, the polymer film can be advantageously used for a display. Specifically, the polymer film can be advantageously applied to a mobile display device that is susceptible to severe external conditions such as moisture and/or heat. In particular, the polymer film can be advantageously applied to a front panel for a foldable display.

The polymer film according to an embodiment comprises butanoic acid in addition to the polymer resin.

The polymer film according to an embodiment comprises a polymer resin and butanoic acid. The polymer resin comprises a polymer resin selected from the group consisting of a polyamide-based resin and a polyimide-based resin. The polymer film comprises a polymer resin, and the polymer resin comprises a plurality of imide repeat units.

Butanoic acid is represented by the following Formula T.

[Formula T]

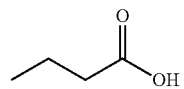

Specifically, butanoic acid refers to the compound represented by the above Formula T. It does not refer to a form in which a part of the butanoic acid is substituted, a derivative, a salt, or anhydride of butanoic acid.

The polymer film comprises butanoic acid, and butanoic acid is contained in the film in an amount of 1 ppm to 1,200 ppm based on the total weight of the polymer film.

Specifically, butanoic acid may be contained in the film in an amount of 1 ppm to 1,000 ppm, 5 ppm to 1,000 ppm, 10 ppm to 1,000 ppm, 50 ppm to 1,000 ppm, 100 ppm to 1,000 ppm, 500 ppm to 1,000 ppm, 1 ppm to 800 ppm, 1 ppm to 700 ppm, 1 ppm to 500 ppm, 1 ppm to 300 ppm, 10 ppm to 300 ppm, 30 ppm to 300 ppm, or 50 ppm to 270 ppm, but it is not limited thereto.

The content refers to the amount of butanoic acid that is not volatilized during the film production and remains in the film finally produced.

If the content of butanoic acid in the polymer film exceeds the above range, there may arise a problem that some substances may be eluted on the film upon the autoclave treatment, which rapidly increases the haze of the film.

The butanoic acid may be a residual of butanoic acid added as a pH adjusting agent in the process of preparing the film or may be a by-product generated by other reactions, but it is not limited thereto. That is, the butanoic acid remaining in the final film may be produced by various courses.

Since butanoic acid remains in the polymer film, it is excellent in restorability, when it has been folded for a long period of time and then returns to the unfolded state by releasing the force applied to the film, and excellent in folding characteristics. Thus, it can be advantageously applied to a foldable display, a flexible display, a rollable display, and the like.

If the content of butanoic acid remaining in the polymer film exceeds the above range, the static flexural characteristics and folding characteristics of the film may be deteriorated, and the optical properties such as transmittance and yellow index may also be deteriorated.

When the polymer film according to an embodiment based on a thickness of 50 μm is folded to have a radius of curvature of 2 mm, which is then left at 25° C. for 24 hours, and the force applied to the film is released, the inner angle of the film is 120° or more.

Specifically, when the polymer film according to an embodiment based on a thickness of 50 μm is folded to have a radius of curvature of 2 mm, which is then left at 25° C. for 24 hours, and the force applied to the film is released, the inner angle of the film may be 125° or more, 130° or more, or 135° or more, but it is not limited thereto.

The conventional films are vulnerable to external presses. In particular, they are significantly deformed when they have been folded for a long period of time. Thus, when applied to a display device, they do not show a uniform screen state, resulting in a problem that the screen is distorted. Specifically, when the conventional films based on a thickness of 50 μm are folded to have a radius of curvature of 2 mm, which are then left at 25° C. for 24 hours, and the force applied to the film is released, the inner angle of the film is less than 120°, specifically less than 115°, resulting in a deterioration in the static flexural characteristics.

In contrast, since the polymer film according to an embodiment has an inner angle of 120° or more upon the above test, it secures excellent restorability as compared with the conventional films. When it is subjected to a subsequent process (for example, it is applied to a foldable display or a flexible display), the problem that the screen is distorted is resolved.

In another embodiment, the polymer film is stretched at a stretching ratio of 1.01 to 1.15 times in the MD direction.

If the stretching ratio in the MD direction of the polymer film according to an embodiment satisfies the above range, it is little deformed when it has been folded for a long period of time and then returns to the unfolded state by releasing the force applied to the film, excellent in folding characteristics, and excellent in durability against physical impacts. Specifically, the stretching causes crystallization in the film through orientation, whereby it is possible to obtain a film that is excellent in flexural resistance.

If the stretching ratio in the MD direction of the polymer film according to an embodiment exceeds the above range, the restorability of the film is particularly deteriorated, and it is difficult to achieve the desired physical properties.

The polyamide-based resin is a resin that contains an amide repeat unit. The polyimide-based resin is a resin that contains an imide repeat unit.

In addition, a resin comprising the imide repeat unit and the amide repeat unit may be referred to as the polyamide-based resin and may be referred to as the polyimide-based resin.

For example, the polymer resin may be a resin comprising a polyamide-based resin, a resin comprising a polyimide-based resin, or a resin comprising both a polyamide-based resin and a polyimide-based resin.

The polymer film according to an embodiment comprises a polymer resin prepared by polymerizing a diamine compound, a dianhydride compound, and optionally a dicarbonyl compound.

As an embodiment, the molar ratio of the dianhydride compound and the dicarbonyl compound is 2:98 to 50:50, 5:95 to 50:50, 10:90 to 50:50, 2:98 to 25:75, 2:98 to 15:85, 20:80 to 100:0, 25:75 to 100:0, 30:70 to 100:0, 40:60 to 100:0, or 50:50 to 100:0.

If the molar ratio of the dianhydride compound and the dicarbonyl compound is within the above range, a film having excellent optical properties in a high-temperature and high-humidity environment and high durability can be obtained. In addition, it is possible to obtain a transparent film that is excellent in restorability, when it has been folded for a long period of time and then returns to the unfolded state by releasing the force applied to the film, and excellent in folding characteristics.

As another embodiment, the dianhydride compound may be composed of one, two, or more types, and the dicarbonyl compound may be composed of zero, one, two, or more types.

The polymer resin comprises an imide repeat unit derived from the polymerization of the diamine compound and the dianhydride compound and an amide repeat unit derived from the polymerization of the diamine compound and the dicarbonyl compound.

Here, the polymer resin may comprise an imide repeat unit and an amide repeat unit at a molar ratio of 2:98 to 50:50, 5:95 to 50:50, 10:90 to 50:50, 2:98 to 25:75, 2:98 to 15:85, 20:80 to 100:0, 25:75 to 100:0, 30:70 to 100:0, 40:60 to 100:0, or 50:50 to 100:0, but it is not limited thereto.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

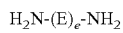   [Formula 1]

In Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a, but it is not limited thereto.

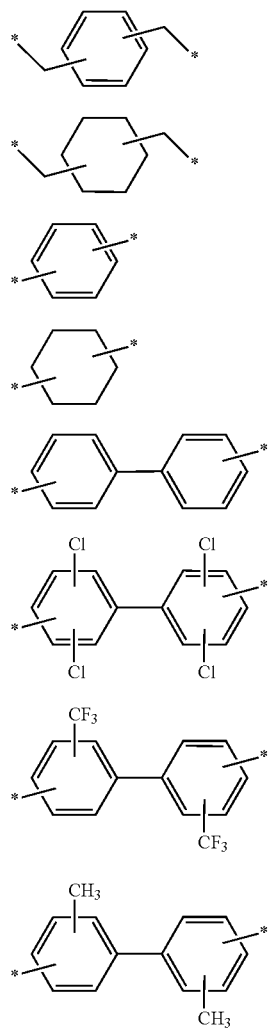

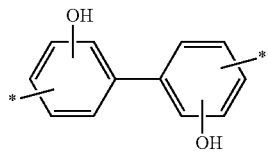

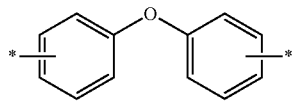

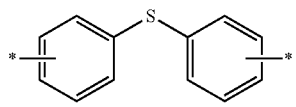

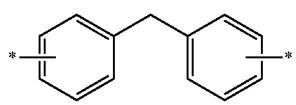

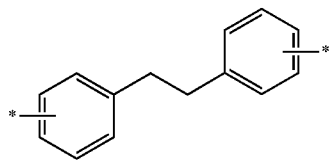

(n is selected from integers of 1-12)

Specifically, (E)$_e$ in Formula 1 may be selected from the groups represented by the following Formulae 1-1b to 1-13b, but is not limited thereto.

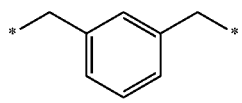

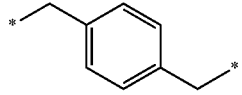

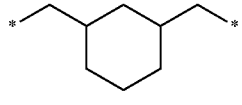

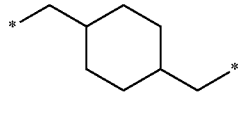

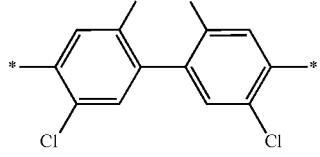

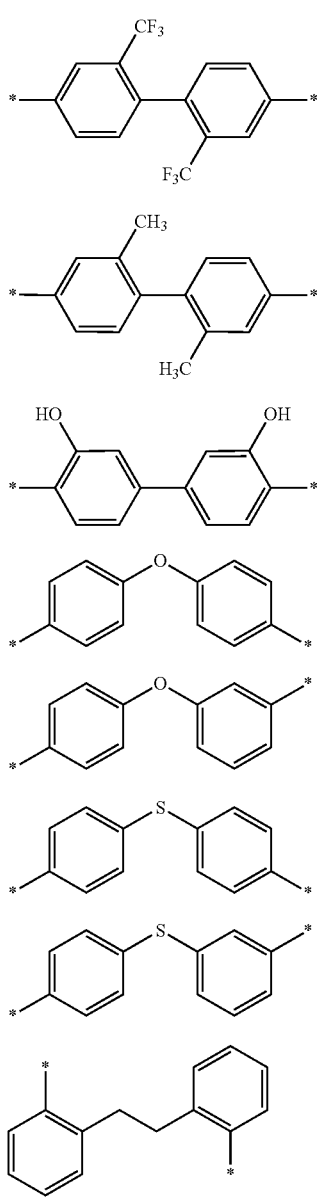

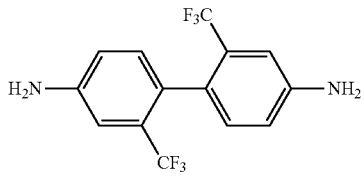

TFDB

More specifically, $(E)_e$ in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

Alternatively, the diamine compound may comprise TFMB and 4,4'-oxydianiline (ODA), but it is not limited thereto.

The dianhydride compound has a low birefringence value, so that it can contribute to enhancements in the optical properties such as transmittance of a film that comprises the polymer resin. The polymer resin refers to the resin that contains an imide repeat unit.

The dianhydride compound is not particularly limited, but it may be, for example, an aromatic dianhydride compound that contains an aromatic structure or an alicyclic dianhydride compound that contains an alicyclic structure.

For example, the aromatic dianhydride compound may be a compound represented by the following Formula 2.

[Formula 2]

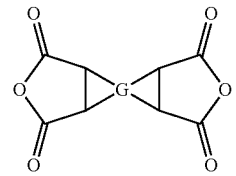

In Formula 2, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in Formula 2 may be selected from the groups represented by the following Formulae 2-1a to 2-9a, but it is not limited thereto.

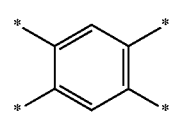

2-1a

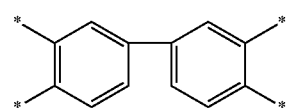

2-2a

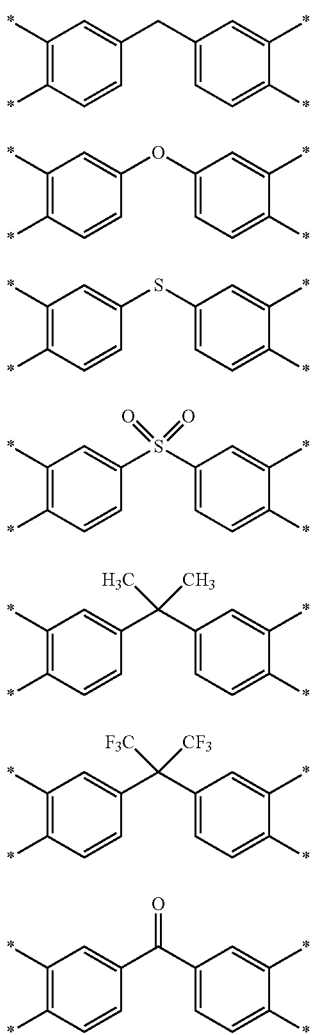

2-3a 2-4a 2-5a 2-6a 2-7a 2-8a 2-9a

For example, G in Formula 2 may be the group represented by the above Formula 2-2a, the group represented by the above Formula 2-8a, or the group represented by the above Formula 2-9a.

In addition, the alicyclic dianhydride compound may comprise a compound having a cyclobutane structure. Specifically, the alicyclic dianhydride compound may be cyclobutane-1,2,3,4-tetracarboxylic dianhydride (CBDA), but it not limited thereto.

In another embodiment, the dianhydride compound may comprise a compound having a fluorine-containing substituent, a compound having a biphenyl group, a compound having a ketone group, or a compound having a cyclobutane group.

The dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two or more components.

For example, the dianhydride compound may comprise 2,2'-bis-(3,4-dicarboxyphenyl)hexafluoropropane dianhydride (6FDA) represented by the following formula, but it is not limited thereto.

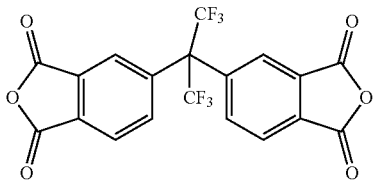

6-FDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

[Formula A]

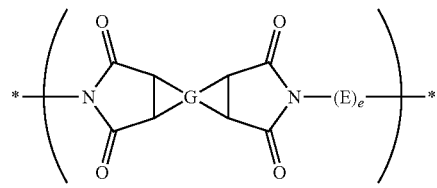

In Formula A, E, G, and e are as described above.

For example, the polyimide may comprise a repeat unit represented by the following Formula A-1, but it is not limited thereto.

[Formula A-1]

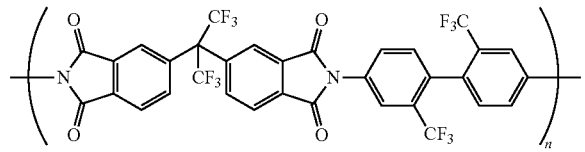

In Formula A-1, n is an integer of 1 to 400.

The dicarbonyl compound is not particularly limited, but it may be, for example, a compound represented by the following Formula 3.

[Formula 3]

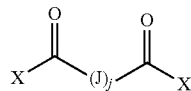

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in Formula 3 may be selected from the groups represented by the following Formulae 3-1a to 3-14a, but it is not limited thereto.

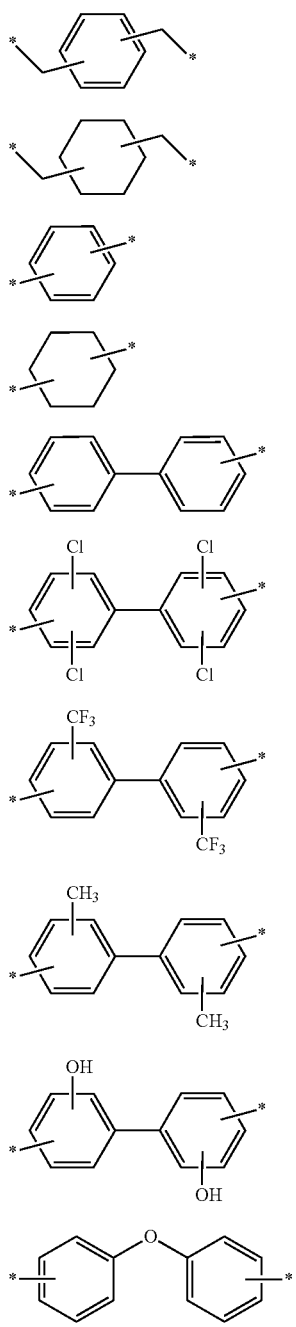

*—(CH$_2$)$_n$—*

(n is selected from integers of 1-12)

Specifically, (J)$_j$ in Formula 3 may be selected from the groups represented by the following Formulae 3-1b to 3-8b, but it is not limited thereto.

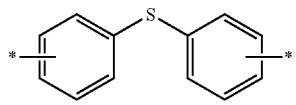

3-1b

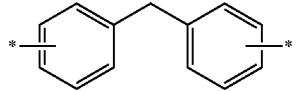

3-2b

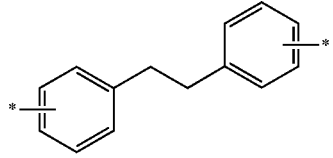

3-3b

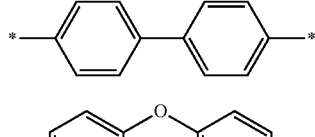

3-4b

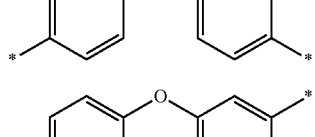

3-5b

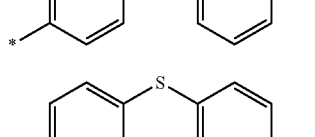

3-6b

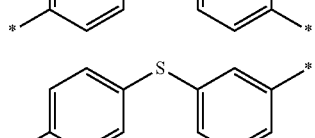

3-7b

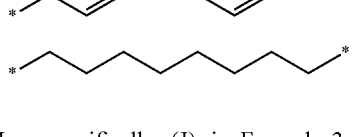

3-8b

More specifically, (J)$_j$ in Formula 3 may be the group represented by the above Formula 3-1b, the group represented by the above Formula 3-2b, the group represented by the above Formula 3-3b, or the group represented by the above Formula 3-8b.

In an embodiment, one type of dicarbonyl compound or a mixture of at least two kinds of dicarbonyl compounds different from each other may be used as the dicarbonyl compound. If two or more dicarbonyl compounds are used, at least two dicarbonyl compounds in which $(J)_j$ in the above Formula 3 are selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film thus produced that comprises the polyamide-imide resin.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

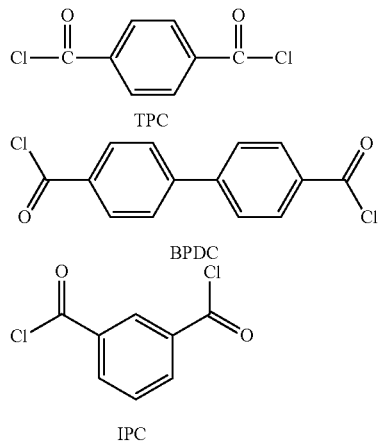

For example, the first dicarbonyl compound may comprise BPDC, and the second dicarbonyl compound may comprise TPC, but they are not limited thereto.

If BPDC is used as the first dicarbonyl compound and TPC is used as the second dicarbonyl compound in a proper combination, a film that comprises the polyamide-imide resin thus produced may have high oxidation resistance.

Alternatively, the first dicarbonyl compound may comprise IPC, and the second dicarbonyl compound may comprise TPC, but they are not limited thereto.

If IPC is used as the first dicarbonyl compound and TPC is used as the second dicarbonyl compound in a proper combination, a film that comprises the polyamide-imide resin thus produced may not only have high oxidation resistance, but is also economical since the costs can be reduced.

The diamine compound and the dicarbonyl compound may be polymerized to form a repeat unit represented by the following Formula B.

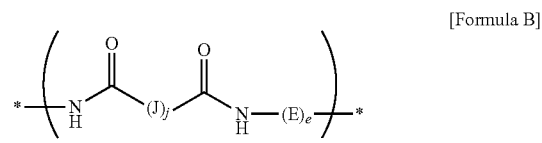

[Formula B]

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

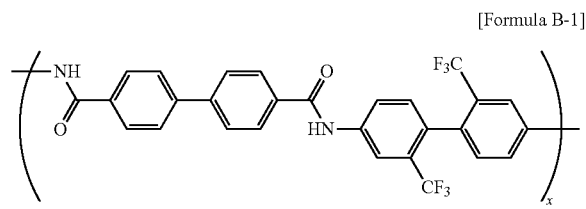

[Formula B-1]

In Formula B-1, x is an integer of 1 to 400.

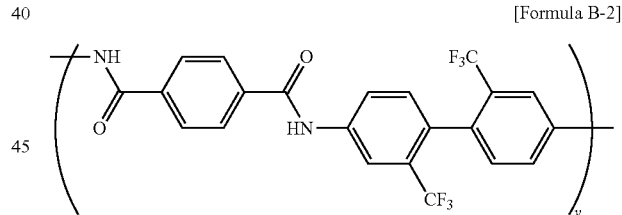

[Formula B-2]

In Formula B-2, y is an integer of 1 to 400.

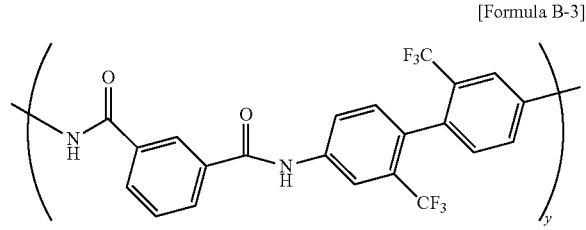

[Formula B-3]

In Formula B-3, y is an integer of 1 to 400.

According to an embodiment, the polymer resin may comprise a repeat unit represented by the following Formula A and optionally a repeat unit represented by the following Formula B:

[Formula A]

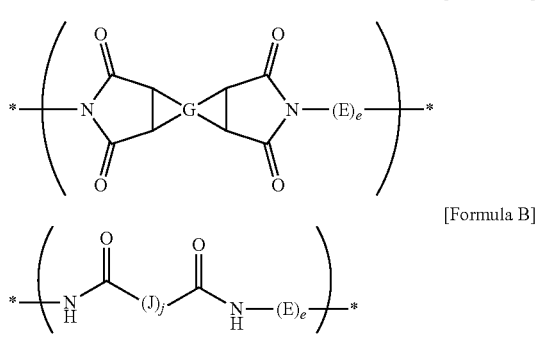

[Formula B]

In Formulae A and B,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

The polymer resin may comprise the repeat unit represented by the following Formula A and the repeat unit represented by the following Formula B at a molar ratio of 2:98 to 50:50, 5:95 to 50:50, 10:90 to 50:50, 2:98 to 25:75, 2:98 to 15:85, 20:80 to 100:0, 25:75 to 100:0, 30:70 to 100:0, 40:60 to 100:0, or 50:50 to 100:0, but it is not limited thereto.

If the molar ratio of the repeat unit represented by the above Formula A to the repeat unit represented by the above Formula B is within the above range, the polymer film is excellent in folding characteristics and excellent in optical properties and mechanical properties at high temperature and high humidity.

Specifically, the CONH structure present in the repeat unit represented by the above Formula B has a high affinity with OH groups, thereby showing excellent hygroscopicity to attract moisture, thereby having slip properties. Thus, it is possible to achieve a film that is hardly deteriorated in mechanical properties and optical properties at high temperature and high humidity.

According to another embodiment, the polymer film may further comprise a filler.

The filler may be at least one selected from the group consisting of barium sulfate, silica, and calcium carbonate. As the polymer film comprises the filler, it is possible to enhance not only the roughness and winderability but also the effect of improving the scratches caused by sliding in the preparation of the film.

In addition, the filler may have a particle diameter of 0.01 µm to 1.0 µm, or 0.01 µm to less than 1.0 µm. For example, the particle diameter of the filler may be 0.05 µm to 0.9 µm, 0.1 µm to 0.8 µm, 0.1 µm to 0.5 µm, or 0.1 µm to 0.3 µm, but it is not limited thereto.

The polymer film may comprise the filler in an amount of 0.01 to 3.5% by weight, 0.01 to 3% by weight, or 0.01 to 2.5% by weight, based on the total weight of the polymer film.

The polymer film may have a transmittance of 80% or more. For example, the transmittance may be 85% or more, 88% or more, 89% or more, 80% to 99%, 85% to 99%, or 88% to 99%.

The polymer film has a yellow index of 5 or less. For example, the yellow index may be 4 or less, or 3.5 or less, but it is not limited thereto.

The polymer film has a haze of 2% or less, Specifically, the haze may be 1.8% or less, 1.5% or less, 1% or less, 0.8% or less, or 0.5% or less, but it is not limited thereto.

The polymer film has a modulus of 4.0 GPa or more, 4.2 GPa or more, 4.5 GPa or more, or 5.0 GPa or more. Specifically, the modulus may be 5.5 GPa or more, 6.0 GPa or more, 6.2 GPa or more, or 6.0 GPa to 8.0 GPa, but it is not limited thereto.

The polymer film has a compressive strength is 0.3 kgf/µm or more. Specifically, the compressive strength may be 0.4 kgf/µm or more, 0.45 kgf/µm or more, or 0.48 kgf/µm or more, but it is not limited thereto.

When the polymer film is perforated at a rate of 10 mm/min using a 2.5-mm spherical tip in a UTM compression mode, the maximum diameter (mm) of perforation including a crack is 65 mm or less. Specifically, the maximum diameter of perforation may be 60 mm or less, 5 to 60 mm, 10 to 60 mm, 15 to 60 mm, 20 to 60 mm, 25 to 60 mm, or 25 to 58 mm, but it is not limited thereto.

The polymer film has a surface hardness of HB or higher. Specifically, the surface hardness may be H or higher, or 2H or higher, but it is not limited thereto.

The polymer film has a tensile strength of 14 kgf/mm$^2$ or more. Specifically, the tensile strength may be 15 kgf/mm$^2$ or more, 16 kgf/mm$^2$ or more, 18 kgf/mm$^2$ or more, 20 kgf/mm$^2$ or more, 21 kgf/mm$^2$ or more, or 22 kgf/mm$^2$ or more, but it is not limited thereto.

The polymer film has an elongation of 13% or more. Specifically, the elongation may be 15% or more, 16% or more, 17% or more, or 17.5% or more, but it is not limited thereto.

The polymer film according to an embodiment may secure excellent optical properties in terms of low haze and yellow index (YI) and excellent mechanical properties in terms of high modulus, compressive strength, maximum diameter of perforation, surface hardness, tensile strength, and elongation, as well as excellent folding characteristics and excellent optical properties and mechanical properties at high temperature and high humidity. Thus, it is possible to impart long-term stable mechanical properties and optical properties to a substrate that requires flexibility in terms of modulus, elongation, tensile characteristics, elastic restoring force, and flexural resistance.

The physical properties of the polymer film as described above are based on a thickness of 40 µm to 60 µm or a thickness of 70 µm to 90 µm. For example, the physical properties of the polymer film are based on a thickness of 50 µm or a thickness of 80 µm.

The features on the components and properties of the polymer film as described above may be combined with each other.

In addition, the properties of the polymer film as described above are the results materialized by combinations of the chemical and physical properties of the components, which constitute the polymer film, along with the conditions in each step of the process for preparing the polymer film as described below.

Front Panel for a Display

The front panel for a display according to an embodiment comprises a polymer film and a functional layer.

The polymer film comprises a polymer resin selected from the group consisting of a polyamide-based resin and a polyimide-based resin.

The polymer film according to an embodiment has a haze ($HZ_0$) of 3% or less before autoclave treatment and a $\Delta HZ_{24}$ value represented by the above Equation 1a of 500% or less.

The polymer film according to another embodiment has a modulus ($MO_0$) before autoclave treatment of 5 GPa or more and a $\Delta TS_{24}$ represented by the above Equation 1b of 15% or less.

The polymer film according to still another embodiment comprises a polymer resin and butanoic acid.

The details on the polymer film are as described above.

The front panel may be advantageously applied to a display device.

The polymer film is excellent in folding characteristics and can maintain excellent optical properties and mechanical properties even under the severe conditions of high temperature and high humidity. In particular, the functional layer, let alone the polymer film, is excellent in folding characteristics, so that the front panel can be advantageously applied to a foldable display device or a flexible display device.

Display Device

The display device according to an embodiment comprises a display unit; and a front panel disposed on the display unit, wherein the front panel comprises a polymer film.

In addition, the polymer film comprises a polymer resin selected from the group consisting of a polyamide-based resin and a polyimide-based resin.

The polymer film according to an embodiment has a haze ($HZ_0$) of 3% or less before autoclave treatment and a $\Delta HZ_{24}$ value represented by the above Equation 1a of 500% or less.

The polymer film according to another embodiment has a modulus ($MO_0$) before autoclave treatment of 5 GPa or more and a $\Delta TS_{24}$ represented by the above Equation 1b of 15% or less.

The polymer film according to still another embodiment comprises a polymer resin and butanoic acid.

The details on the polymer film and the front panel are as described above.

FIG. 1 is a cross-sectional view of a display device according to an embodiment.

Specifically, FIG. 1 illustrates a display device, which comprises a display unit (400) and a front panel (300) disposed on the display unit (400), wherein the front panel comprises a polymer film (100) having a first side (101) and a second side (102) and a functional layer (200), and an adhesive layer (500) is interposed between the display unit (400) and the front panel (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel displays an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the front panel (300). The adhesive layer may be an optically transparent adhesive layer, but it is not particularly limited.

The front panel (300) is disposed on the display unit (400). The front panel is located at the outermost position of the display device to thereby protect the display unit.

The front panel (300) may comprise a polymer film and a functional layer. The functional layer may be at least one selected from the group consisting of a hard coating, a reflectance reducing layer, an antifouling layer, and an antiglare layer. The functional layer may be coated on at least one side of the polymer film.

Process for Preparing a Polymer Film

An embodiment provides a process for preparing a polymer film.

The process for preparing a polymer film according to an embodiment comprises preparing a polymer solution comprising a polymer resin selected from the group consisting of a polyamide-based resin and a polyimide-based resin in an organic solvent; transferring the polymer solution into a tank; extruding and casting the polymer solution in the tank and then drying it to prepare a gel sheet; and thermally treating the gel sheet, wherein the thermal treatment of the gel-sheet is carried out until the content of the residual solvent is 1,200 ppm or less.

The process for preparing a polymer film according to another embodiment comprises polymerizing a diamine compound, a dianhydride compound, and a dicarbonyl compound in an organic solvent in a polymerization apparatus to prepare a polymer solution comprising a polymer resin; transferring the polymer solution into a tank; extruding and casting the polymer solution in the tank and then drying it to prepare a gel sheet; and thermally treating the gel sheet, wherein the thermal treatment of the gel sheet is carried out in a temperature range of 80° C. to 500° C. for 5 to 180 minutes.

The process for preparing a polymer film according to still another embodiment comprises preparing a polymer solution comprising a polymer resin in an organic solvent; transferring the polymer solution into a tank; casting the polymer solution in the tank onto a belt and then drying it to prepare a gel-sheet; and thermally treating the gel-sheet while it is moved to prepare a cured film.

Figure 2:
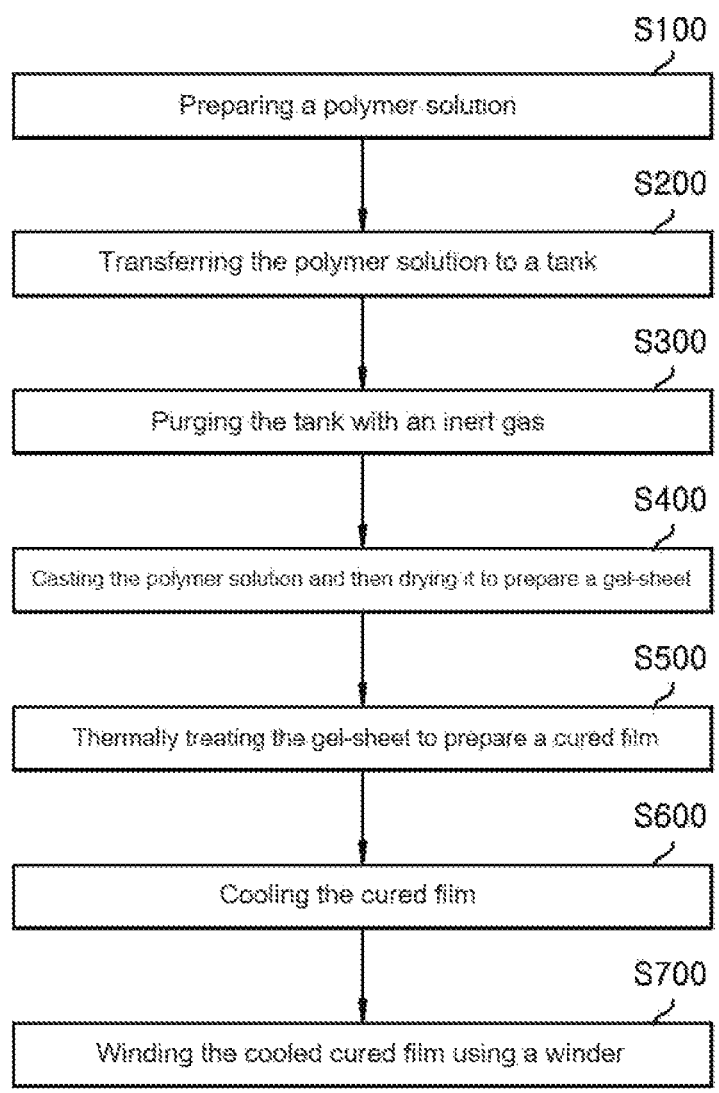
FIG. 2 is a schematic flow diagram of a process for preparing a polymer film according to an embodiment.

Referring to FIG. 2, the process for preparing a polymer film comprises simultaneously or sequentially mixing a diamine compound, a dianhydride compound, and optionally a dicarbonyl compound in an organic solvent in a polymerization apparatus, and reacting the mixture to prepare a polymer solution (S100); transferring the polymer solution to a tank (S200); purging with an inert gas (S300); casting the polymer solution in the tank onto a belt and then drying it to prepare a gel-sheet (S400); thermally treating the gel-sheet while it is moved to prepare a cured film (S500); cooling the cured film while it is moved (S600); and winding the cooled cured film using a winder (S700).

The polymer film comprises a polymer resin, as a main component, selected from the group consisting of a polyamide-based resin and a polyimide-based resin.

In the process for preparing a polymer film, a polymer solution for preparing the polymer resin is prepared by simultaneously or sequentially mixing a diamine compound and a dicarbonyl compound, or a diamine compound, a dianhydride compound, and a dicarbonyl compound, in an organic solvent in a polymerization apparatus, and reacting the mixture (S100).

In an embodiment, the polymer solution may be prepared by simultaneously mixing and reacting a diamine compound, a dianhydride compound, and a dicarbonyl compound in an organic solvent.

In another embodiment, the step of preparing the polymer solution may comprise mixing and reacting the diamine compound and the dianhydride compound in a solvent to produce a polyamic acid solution; and subjecting the polyamic acid solution to dehydration to produce a polyimide (PI) solution.

In still another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

For example, the polymer contained in the polymer solution may comprise an imide repeat unit derived from the polymerization of the diamine compound and the dianhydride compound.

Alternatively, the polymer contained in the polymer solution may comprise an imide repeat unit derived from the polymerization of the diamine compound and the dianhydride compound and an amide repeat unit derived from the polymerization of the diamine compound and the dicarbonyl compound.

The content of solids contained in the polymer solution may be 10% by weight to 30% by weight. Alternatively, the content of solids contained in the polymer solution may be 15% by weight to 25% by weight, but it is not limited thereto.

If the content of solids contained in the polymer solution is within the above range, a polymer film can be effectively produced in the extrusion and casting steps. In addition, the polymer film thus prepared maintains a clean appearance and transparency while securing specific ranges of optical slip index, maximum static friction coefficient, and kinetic friction coefficient, resulting in excellent antiblocking properties. Further, it can have excellent mechanical properties and optical properties such as low yellowness, which hardly deteriorate even at high temperature and high humidity, is hardly deformed when a certain level of load is continuously applied for a long period of time, and is excellent in folding characteristics.

In an embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.4 molar equivalent based on 1 mole of the polyamic acid, but it is not limited thereto.

Alternatively, the catalyst may be added in an amount of 0.01 to 0.3% by weight based on the total weight of the polymer solution. Specifically, the catalyst may be added in an amount of 0.01 to 0.2% by weight, 0.01 to 0.15% by weight, 0.01 to 0.1% by weight, or 0.02 to 0.1% by weight, based on the total weight of the polymer solution, but it is not limited thereto.

The further addition of the catalyst may expedite the reaction rate and enhance the chemical bonding force between the repeat unit structures or that within the repeat unit structures. Further, it is possible to prepare a film having a low yellow index by using the catalyst.

In an embodiment, the step of preparing the polymer solution may further comprise introducing a dehydrating agent.

In such event, the dehydrating agent may be acetic anhydride, but it is not limited thereto.

The dehydrating agent may be added in an amount of 0.01 to 10% by weight, 0.05 to 5% by weight, or 0.05 to 3% by weight, based on the total weight of the polymer solution, but it is not limited thereto.

The addition of the dehydrating agent produces the effect that a film having a low yellowness and a low haze is prepared.

In another embodiment, the step of preparing the polymer solution may further comprise adjusting the viscosity of the polymer solution.

Specifically, the step of preparing the polymer solution may comprise (a) simultaneously or sequentially mixing and reacting a diamine compound, a dianhydride compound, and optionally a dicarbonyl compound in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dianhydride compound or the dicarbonyl compound to prepare a second polymer solution having the target viscosity.

The target viscosity may be 100,000 cps to 500,000 cps at room temperature. Specifically, the target viscosity may be 100,000 cps to 400,000 cps, 100,000 cps to 350,000 cps, 100,000 cps to 300,000 cps, 150,000 cps to 300,000 cps, or 150,000 cps to 250,000 cps, but it is not limited thereto.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds are different from each other. For example, the stirring speed when the first polymer solution is prepared is faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7, or 4.5 to less than 7, but it is not limited thereto.

The pH of the polymer solution may be adjusted by adding a pH adjusting agent. The pH adjusting agent is not particularly limited and may include, for example, amine-based compounds such as alkoxyamine, alkylamine, and alkanolamine, and carboxylic acid-based compounds such as acetic acid and butanoic acid.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus. Further, the restorability and folding characteristics may be enhanced.

The pH adjusting agent may be added in an amount of 0.01 to 0.7% by weight, 0.01 to 0.5% by weight, or 0.02 to 0.4% by weight, based on the total weight of the polymer solution, but it is not limited thereto.

Alternatively, the pH adjusting agent may be added in an amount of 0.1% by mole to 10% by mole based on the total number of moles of monomers in the polymer solution.

Specifically, if the catalyst is added when the polymer solution is prepared, chemical imidization with the catalyst or thermal imidization is carried out. If the catalyst is used in an appropriated amount, a transparent film having a low yellow index can be prepared. On the other hand, when the catalyst is used, by-products may be generated, or some physical properties may be deteriorated. In such event, the pH adjusting agent may improve the deterioration in physical properties. For example, butanoic acid may be used as the pH adjusting agent. Part of the butanoic acid remains in the final film, which makes it possible to obtain a transparent film that is excellent in restorability, when it has been folded for a long period of time and then returns to the unfolded state by releasing the force applied to the film, and excellent in folding characteristics.

In many cases, a chloride terminal group derived from the monomers for producing the polymer resin or a Cl-based by-product generated from HCl generated during the process for preparing the film lowers the reactivity, thereby producing a polymer having a low molecular weight. However, if butanoic acid is used as the pH adjusting agent, the reactivity of the catalyst is effectively adjusted to reduce the amount of a polymer having a low molecular weight and to facilitate the polymerization to reach a high molecular weight.

Further, there has been a problem that as the low-molecular-weight polymers remaining in the polymer elute after the autoclave treatment (that is, after the treatment under the severe conditions of high temperature and high humidity), thereby rapidly deteriorating the optical properties. In addition, there has been a problem that a barrier layer is formed in the conventional polymer films in a high-temperature and high-humidity environment. In order to solve this problem, additives such as clay that are resistant to moisture are introduced, in which case the optical properties or compatibility may be deteriorated.

In contrast, the addition of butanoic acid during the polymerization process as in the polymer film according to an embodiment can solve the above-mentioned problems. It is possible to obtain a polymer film that is hardly deteriorated in optical properties and mechanical properties even after treatment under the severe conditions of high temperature and high humidity and is excellent in folding characteristics.

In another embodiment, the step of preparing the polymer solution may further comprise purging with an inert gas. The step of purging with an inert gas may remove moisture, reduce impurities, increase the reaction yield, and impart excellent surface appearance and mechanical properties to the film finally produced.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The molar ratio of the dianhydride compound to the dicarbonyl compound used to prepare the polymer solution may be 2:98 to 15:85. For example, the molar ratio may be 3:97 to 15:85, 5:95 to 15:85, 7:93 to 15:85, 2:98 to 25:75, 2:98 to 15:85, 20:80 to 100:0, 25:75 to 100:0, 30:70 to 100:0, 40:60 to 100:0, or 50:50 to 100:0, but it is not limited thereto.

If the dianhydride compound and the dicarbonyl compound are employed in the above molar ratio, it is advantageous for achieving the desired mechanical properties and optical properties of the polymer film prepared from the polymer solution.

The details on the diamine compound, the dianhydride compound, and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

Next, after the step of preparing the polymer solution, the polymer solution is transferred to a tank (S200).

Figure 3:
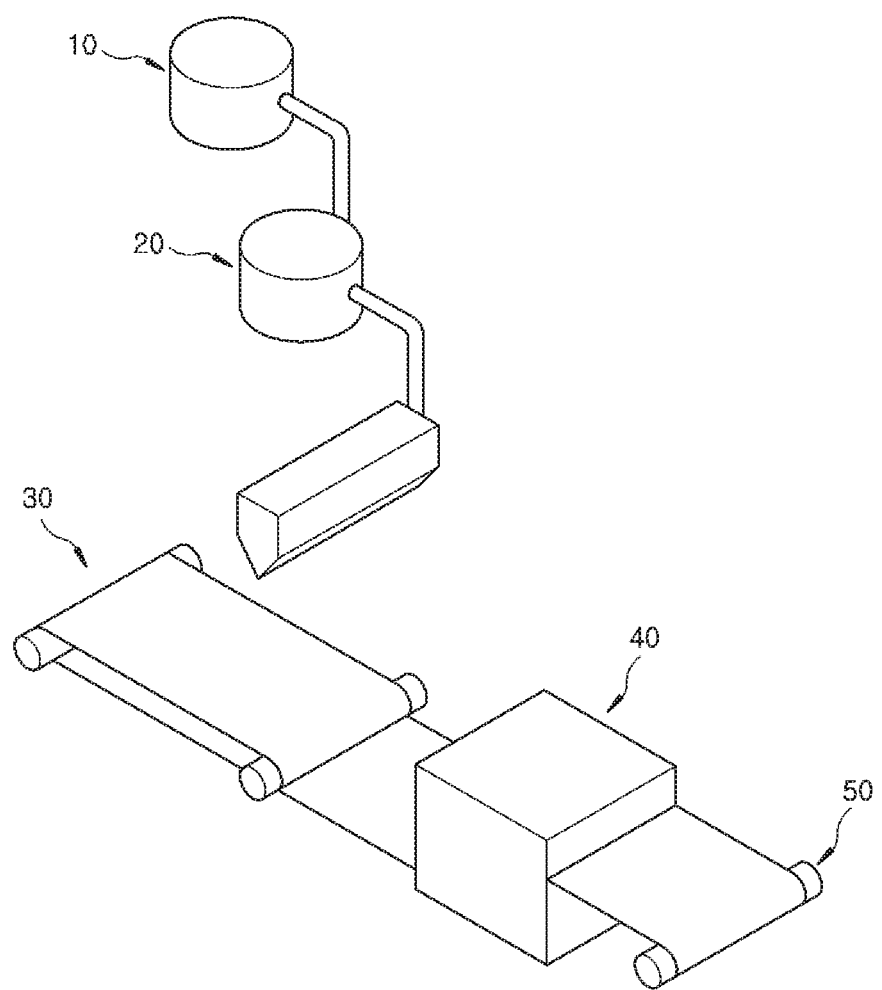
FIG. 3 schematically illustrates process facilities for preparing a polymer film according to an embodiment.

FIG. 3 schematically illustrates process facilities for preparing the polymer film according to an embodiment. Referring to FIG. 3, the polymer solution as described above is prepared in a polymerization apparatus (10), and the polymer solution thus produced is transferred to, and stored in, a tank (20).

Here, once the polymer solution has been prepared, the step of transferring the polymer solution to the tank is carried out without any additional steps. Specifically, the polymer solution prepared in the polymerization apparatus is transferred to, and stored in, the tank without any separate precipitation and redissolution steps for removing impurities. In the conventional process, in order to remove impurities such as hydrochloric acid (HCl) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

The tank (20) is a place for storing the polymer solution before forming it into a film, and its internal temperature may be −20° C. to 20° C.

Specifically, the internal temperature may be −20° C. to 10° C., −20° C. to 5° C., −20° C. to 0° C., or 0° C. to 10° C., but it is not limited thereto.

If the internal temperature of the tank (20) is controlled to the above range, it is possible to prevent the polymer solution from deteriorating during storage, and it is possible to lower the moisture content to thereby prevent defects of the film produced therefrom.

The process for preparing a polymer film may further comprise carrying out vacuum degassing of the polymer solution transferred to the tank (20).

The vacuum degassing may be carried out for 30 minutes to 3 hours after depressurizing the internal pressure of the tank to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the process for preparing a polymer film may further comprise purging the polymer solution transferred to the tank (20) with an inert gas (S300).

Specifically, the purging is carried out by purging the tank with an inert gas at an internal pressure of 1 atm to 2 atm. The nitrogen purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The step of vacuum degassing and the step of purging the tank with an inert gas are performed in a separate step, respectively.

For example, the step of vacuum degassing may be carried out, followed by the step of purging the tank with an inert gas, but it is not limited thereto.

The step of vacuum degassing and/or the step of purging the tank with an inert gas may improve the physical properties of the surface of the polymer film thus produced.

Thereafter, the process may further comprise storing the polymer solution in the tank (20) for 1 hour to 360 hours. Here, the temperature inside the tank may be kept at −20° C. to 20° C.

The process for preparing a polymer film may further comprise extruding and casting the polymer solution in the tank and then drying it to prepare a gel-sheet (S400).

The polymer solution may be cast onto a casting body such as a casting roll or a casting belt.

Referring to FIG. 3, according to an embodiment, the polymer solution may be applied onto a casting belt (30) as a casting body, and it is dried while it is moved to be made into a sheet in the form of a gel.

When the polymer solution is injected onto the belt (30), the injection rate may be 300 g/min to 700 g/min. If the injection rate of the polymer solution satisfies the above range, the gel-sheet can be uniformly formed to an appropriate thickness.

In addition, the casting thickness of the polymer solution may be 200 μm to 700 μm. If the polymer solution is cast to a thickness within the above range, the final film produced after the drying and thermal treatment may have an appropriate and uniform thickness.

As described above, the viscosity of the polymer solution at room temperature may be 100,000 cps to 500,000 cps, for example, 100,000 cps to 400,000 cps, 100,000 cps to 350,000 cps, 150,000 cps to 350,000 cps, or 150,000 cps to 250,000 cps. If the viscosity satisfies the above range, the polymer solution can be cast onto a belt in a uniform thickness without defects.

The polymer solution is cast and then dried at a temperature of 60° C. to 150° C. for 5 minutes to 60 minutes to prepare a gel-sheet. Specifically, the drying may be carried out with hot air at 60° C. to 120° C. for 10 minutes to 50 minutes. For example, the drying may be carried out with hot air at 100° C. for 30 minutes.

The solvent of the polymer solution is partially or totally volatilized during the drying to prepare the gel-sheet.

The moving speed of the gel-sheet on the casting body at the time of drying may be 0.1 m/min to 15 m/min, for example, 0.5 m/min to 10 m/min, but it is not limited thereto.

The process for preparing a polymer film comprises thermally treating the gel-sheet while it is moved to prepare a cured film (S500).

Referring to FIG. 3, the thermal treatment of the gel-sheet may be carried out by passing it through a thermosetting device (40).

The thermal treatment of the gel-sheet is carried out in a temperature range of 80° C. to 500° C. for 5 minutes to 180 minutes. Specifically, the thermal treatment of the gel-sheet may be carried out in a temperature range of 80° C. to 500° C. at a temperature elevation rate of 2° C./min to 80° C./min for 5 minutes to 150 minutes. More specifically, the thermal treatment of the gel-sheet may be carried out in a temperature range of 80° C. to 300° C. at a temperature elevation rate of 2° C./min to 80° C./min.

According to another embodiment, the gel-sheet may be treated with hot air.

If the thermal treatment is carried out with hot air, the heat may be uniformly supplied. If the heat is not uniformly supplied, satisfactory mechanical properties cannot be achieved. In particular, a satisfactory surface roughness cannot be achieved, which may raise or lower the surface tension too much.

For example, the gel-sheet may be treated with hot air for 5 minutes to 60 minutes in a temperature range of 200° C. to 320° C. More specifically, the gel-sheet may be treated with hot air for 25 minutes to 35 minutes in a temperature range of 250° C. to 290° C.

According to still another embodiment, the thermal treatment of the gel-sheet may be carried out in two or more steps.

According to another embodiment, the thermal treatment may be carried out until the content of the residual solvent contained in the gel-sheet is 1,200 ppm or less, or 1,000 ppm or less.

In the thermal treatment, the second thermal treatment step is carried out after the first thermal treatment step. In such event, if the content of the organic solvent contained in the gel-sheet exceeds 1,000 ppm or 1,200 ppm upon the second thermal treatment step, a third thermal treatment step may be additionally carried out.

Specifically, the thermal treatment may comprise a first thermal treatment step carried out for 5 to 30 minutes in a range of 60° C. to 120° C.; and a second thermal treatment step carried out for 30 minutes to 120 minutes in a range of 150° C. to 350° C.

For example, the third thermal treatment step may be carried out in a range of 200° C. to 350° C. until the content of the residual solvent contained in the gel-sheet is 1,200 ppm or less, or 1,000 ppm or less.

In addition, in the thermal treatment step, the gel-sheet may be stretched by 1.01 times to 1.05 times in the MD direction. The gel-sheet may be stretched by 1.01 times to 1.05 times in the MD direction between the first thermal treatment step and the second thermal treatment step.

In the thermal treatment step, the gel-sheet may be stretched by 1.01 times to 1.05 times in the TD direction. In the second thermal treatment step, the gel-sheet may be stretched by 1.01 times to 1.05 times in the TD direction.

The gel-sheet may be simultaneously stretched by 1.01 times to 1.05 times in the MD direction and in the TD direction. The gel-sheet may be sequentially stretched by 1.01 times to 1.05 times in the MD direction and then by 1.01 times to 1.05 times in the TD direction.

The thermal treatment under these conditions may cure the gel-sheet to have an appropriate surface hardness and modulus, and the cured film thus prepared may be excellent in folding characteristics, optical properties and mechanical properties at high temperature and high humidity, and the restorability when it has been folded for a long period of time and the force applied to the film is then released.

The process for preparing a polymer film comprises cooling the cured film while it is moved (S600).

Referring to FIG. 3, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved may comprise a first temperature lowering step of reducing the temperature at a rate of 100° C./min to 1,000° C./min and a second temperature lowering step of reducing the temperature at a rate of 40° C./min to 400° C./min.

In such event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried out in such a multistage manner, it is possible to have the physical properties of the cured film further stabilized and to maintain the optical properties and mechanical properties of the film achieved during the curing step more stably for a long period of time.

The moving speed of the gel-sheet and the moving speed of the cured film are the same.

The process for preparing a polymer film comprises winding the cooled cured film using a winder (S700).

Referring to FIG. 3, the cooled cured film may be wound using a roll-shaped winder (50).

In such event, the ratio of the moving speed of the gel-sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, 1:1.0 to 1:1.05, or 1:1.01 to 1:1.05, but it is not limited thereto.

If the ratio of the moving speeds is outside the above range, the mechanical properties of the cured film may be impaired, and the flexibility and elastic properties may be deteriorated.

In the process for preparing a polymer film, the thickness variation (%) according to the following Equation 1 may be 3% to 30%. Specifically, the thickness variation (%) may be 5% to 20%, but it is not limited thereto.

$$\text{Thickness variation (\%)} = \{(M1-M2)/M2\} \times 100 \quad \text{[Equation 1]}$$

In the above Equation 1, M1 is the thickness (μm) of the gel-sheet, and M2 is the thickness (μm) of the cooled cured film at the time of winding.

The polymer film prepared by the preparation process as described above is excellent in antiblocking characteristics, optical properties, and mechanical properties. The polymer film may be applicable to various uses that require flexural resistance, flexibility, durability, and transparency. For example, the polymer film may be applied to solar cells, semiconductor devices, sensors, and the like, as well as display devices.

The details on the polymer film prepared by the process for preparing a polymer film are as described above.

Hereinafter, the above description will be described in detail by referring to examples. However, these examples are set forth to illustrate the present invention, and the scope of the present invention is not limited thereto.

EXAMPLE AND EVALUATION EXAMPLE

Example 1a

A 1-liter glass reactor equipped with a temperature-controllable double jacket was charged with dimethylacetamide (DMAc) as an organic solvent at 20° C. under a nitrogen atmosphere. Then, 2,2'-bis(trifluoromethyl)-4,4'-diaminobiphenyl (TFMB) (0.2 mole) was slowly added thereto for dissolution thereof. Subsequently, 2,2'-bis(3,4-dicarboxyphenyl)hexafluoropropane dianhydride (6FDA) (0.1 mole) was slowly added thereto, and the mixture was stirred for 1 hour. Then, terephthaloyl chloride (TPC) (0.1 mole) as a dicarbonyl compound was added, followed by stirring the mixture for 1 hour, thereby preparing a polymer solution.

Subsequently, 17 g of acetic anhydride as a dehydrating agent and 4.5 g of isoquinoline as a catalyst were added to the polymer solution, followed by stirring for 1 hour. Thereafter, butanoic acid as a pH adjusting agent was added, followed by stirring for 2 hours to prepare a polymer solution.

The polymer solution thus obtained was coated onto a glass plate and then dried with hot air at 100° C. for 30 minutes. It was then detached from the glass plate and then fixed to a pin frame, which was thermally treated at 270° C. for 30 minutes to obtain a polymer film having a thickness of 50 μm.

Examples 2a and 3a and Comparative Examples 1a and 2a

Films were prepared in the same manner as in Example 1a, except that the types and contents of the respective reactants and the like were changed as shown in Table 1 below.

The films prepared in Examples 1a to 3a and Comparative Examples 1a and 2a were each measured and evaluated for the following properties. The results are shown in Table 1 below.

Evaluation Example 1a: Measurement of Film Thickness

The thickness was measured at 5 points in the transverse direction using a digital micrometer 547-401 manufactured by Mitutoyo Corporation. Their average value was adopted as the thickness.

Evaluation Example 2a: Measurement of the Content of the Residual Solvent in a Film The temperature was raised from room temperature to 300° C. in a nitrogen stream at a temperature elevation rate of 15° C./min and maintained at 300° C. for 30 minutes in a thermogravimetric analyzer (DTG-50 manufactured by Shimadzu Corporation). The value obtained by dividing the sum of the weights reduced during the temperature elevation from 150° C. to 300° C. and maintenance at 300° C. for 30 minutes by the initial weight of the sample was taken as the content of the residual solvent in the film.

Evaluation Example 3a: Measurement of the Content of Butanoic Acid in a Film

The TD-GC MS analysis was used to measure the content of butanoic acid in a film. Specifically, 0.02 g of a film sample was loaded into a sample tube, which was heated from 25° C. to 300° C. at a rate of 10° C./min. The gas generated as the temperature was raised was adsorbed to the adsorption tube (Tenax), which was instantaneously heated (desorbed) and separated into each component by gas chromatography. The separated components were detected on a mass spectrometer and analyzed for the type and content of the components in the chromatogram obtained.

The content of butanoic acid was measured in ppm based on the total weight of the film. The results are shown in Table 1 below.

Evaluation Example 4a: Measurement of Transmittance and Haze

The transmittance at 550 nm was measured using a haze meter NDH-5000W manufactured by Nippon Denshoku Kogyo.

Evaluation Example 5a: Measurement of Yellow Index

The yellow index (YI) was measured with a spectrophotometer (UltraScan PRO, Hunter Associates Laboratory) using a CIE colorimetric system.

Evaluation Example 6a: Measurement of in-Plane Retardation

The in-plane retardation (Ro) was measured with a retardation measuring device (Axoscan of Axometrics, measuring wavelength: 550 nm). In addition, the refractive index as a basic data for measuring the retardation was measured with an Abbe refractometer (NAR-4T manufactured by Atago Co., Ltd., measuring wavelength: 589.3 nm).

Evaluation Example 7a: Autoclave Treatment

A film having a length of 10 cm, a width of 2 cm, and a thickness of 50 μm was fixed in an autoclave, the autoclave was filled with 2 liters of water, and the autoclave was then closed and heated. In such event, the temperature of the autoclave was set to 120° C., and the pressure was raised to 1.2 atm for the treatment for 24 hours. After the set time elapsed, the autoclave was automatically turned off. After the outlet valve was opened, the film was taken out and the physical properties were measured. The film was not immersed in water.

Evaluation Example 8a: Measurement of Flexural Resistance

The number of folding was counted when the film having a thickness of 50 μm was folded to have a radius of curvature of 3 mm and then unfolded (the number of folding counts one upon folding and unfolding). If no deformation was visually observed at the folded side upon repeated folding of 100,000 times, it was indicated as ○. If a deformation was visually observed at the folded side upon repeated folding of 100,000 times, it was indicated as x. The number of folding times was counted using the U-shape folding equipment of YUASA.

TABLE 1

|  |  | Ex. 1a | Ex. 2a | Ex. 3a | C. Ex. 1a | C. Ex. 2a |
| --- | --- | --- | --- | --- | --- | --- |
| Composition | Diamine (mole) | TFMB 0.2 | TFMB 0.2 | TFMB 0.2 | TFMB 0.2 | TFMB 0.2 |
|  | Dianhydride (mole) | 6FDA 0.1 | 6FDA 0.02 | CBDA 0.05 6FDA 0.05 | 6FDA 0.1 | 6FDA 0.02 |
|  | Dicarbonyl compound (mole) | TPC 0.1 | IPC 0.06 TPC 0.12 | TPC 0.1 | TPC 0.1 | IPC 0.06 TPC 0.12 |
|  | Imide:amide ratio (molar ratio) | 50:50 | 10:90 | 50:50 | 50:50 | 10:90 |

TABLE 1-continued

|  |  | Ex. 1a | Ex. 2a | Ex. 3a | C. Ex. 1a | C. Ex. 2a |
|---|---|---|---|---|---|---|
| Film thickness (μm) |  | 50 | 50 | 50 | 50 | 50 |
| Content of residual solvent in a film (ppm) |  | 950 | 850 | 735 | 1350 | 1520 |
| Content of butanoic acid in a film (ppm) |  | 1000 | 1000 | 700 | — | — |
| IS value |  | 145 | 95 | 123.5 | 185 | 162 |
| Transmittance | % | 90.1 | 90.3 | 89.5 | 90.1 | 90.2 |
| Haze ($HZ_0$) | % | 0.41 | 0.53 | 0.52 | 0.42 | 0.56 |
| Yellow index ($HZ_0$) | — | 2.3 | 2.5 | 2.7 | 2.3 | 2.5 |
| In-plane retardation ($Ro_0$) | nm | 150 | 135 | 95 | 200 | 185 |
| After autoclave treatment (24 hr) Haze ($HZ_{24}$) | % | 1.22 | 1.53 | 1.15 | 3.58 | 4.31 |
| After autoclave treatment (24 hr) $\Delta HZ_{24}$ | % | 197.56 | 188.68 | 121.15 | 752.38 | 669.64 |
| After autoclave treatment (24 hr) Yellow index ($YI_{24}$) | — | 2.3 | 2.6 | 2.7 | 3 | 3.2 |
| After autoclave treatment (24 hr) $\Delta YI_{24}$ | % | 0 | 4 | 0 | 30.43 | 28 |
| After autoclave treatment (24 hr) In-plane retardation ($Ro_{24}$) | nm | 143 | 140 | 101 | 220 | 195 |
| After autoclave treatment (24 hr) $\Delta Ro_{24}$ | % | 4.67 | 3.70 | 6.32 | 10 | 5.41 |
| Flexural resistance | 3R, 100K | ○ | ○ | ○ | × | × |
| CT value | — | 2.96 | 2.55 | 1.15 | 15.05 | 12.39 |

As can be seen from Table 1 above, the polymer films of Examples 1a to 3a had a content of the residual solvent in the film of 1,200 ppm or less and a content of butanoic acid of 1,200 ppm or less. Thus, they maintained excellent optical properties even after the treatment under the harsh conditions of high temperature and high humidity.

In contrast, the polymer films of Comparative Examples 1a and 2a had no butanoic acid remaining in the film and a content of the residual solvent exceeding 1,200 ppm. The low-molecular-weight polymers remaining in the polymer eluted upon the autoclave treatment. Thus, the optical properties such as haze, yellowness, and in-plane retardation were significantly deteriorated.

Example 1b

A 1-liter glass reactor equipped with a temperature-controllable double jacket was charged with 585.68 g of dimethylacetamide (DMAc) as an organic solvent at 20° C. under a nitrogen atmosphere. Then, 0.2 mole of 2,2'-bis(trifluoromethyl)-4,4'-diaminobiphenyl (TFMB) was slowly added thereto for dissolution thereof. Thereafter, 0.02 mole of 3,3',4,4'-benzophenone (BTDA) was slowly added, followed by stirring for 1 hour. Then, 0.06 mole of isophthaloyl chloride (IPC) was added, followed by stirring for 1 hour. And 0.12 mole of terephthaloyl chloride (TPC) was added, followed by stirring for 1 hour, thereby preparing a polymer solution. The polymer solution thus obtained was coated onto a glass plate and then dried with hot air at about 80° C. for 20 minutes to prepare a gel-sheet. The gel-sheet was detached from the glass plate and then fixed to a pin frame. The gel-sheet was fixed to a pin frame while it was stretched by 1.03 times in a first direction and in a second direction perpendicular to the first direction, respectively. The fixed gel-sheet was thermally treated at about 270° C. for 30 minutes to obtain a polymer film having a thickness of 50 μm.

As to the contents of TFMB, BTDA, TPC, and IPC, the number of moles of the dianhydride compound and the dicarbonyl compounds based on 100 moles of the diamine compound is shown in Table 2.

Examples 2b to 6b and Comparative Examples 1b to 3b

Films were prepared in the same manner as in Example 1b, except that the types and contents of the respective reactants, the time for the thermal treatment, and the like were changed as shown in Table 2 below.

The films prepared in Examples 1b to 6b and Comparative Examples 1b to 3b were each measured and evaluated for the following properties. The results are shown in Table 2 below.

Evaluation Example 1b: Measurement of Film Thickness

The thickness was measured at 5 points in the transverse direction using a digital micrometer 547-401 manufactured by Mitutoyo Corporation. Their average value was adopted as the thickness.

Evaluation Example 2b: Measurement of Residual Solvents in a Film 0.02 g of a sample was taken and purged for 1 hour at 30° C. using a Purge&Trap-GC/MSD device. The outgassing was collected at 300° C. for 10 minutes, which was quantitatively and qualitatively analyzed to measure the amount of the residual solvent.

Evaluation Example 3b: Measurement of Tensile Strength and Elongation at Break

A sample was cut out by at least 5 cm in the direction perpendicular to the main shrinkage direction of the film and by 10 cm in the main shrinkage direction. It was fixed by the clips disposed at intervals of 10 cm in a universal testing machine UTM 5566A of Instron. A stress-strain curve was obtained until the sample was fractured while it was stretched at a rate of 12.5 mm/min at room temperature. The tensile strength and elongation at break were measured from the stress-strain curve.

Evaluation Example 4b: Measurement of Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain on the stress-strain curve was taken as the modulus (GPa).

Evaluation Example 5b: Autoclave Treatment

A film having a length of 10 cm, a width of 2 cm, and a thickness of 50 μm was fixed in an autoclave, the autoclave was filled with 2 liters of water, and the autoclave was then closed and heated. In such event, the temperature of the autoclave was set to 120° C., and the pressure was raised to 1.2 atm for the treatment for 24 hours or 72 hours. After the set time elapsed, the autoclave was automatically turned off. After the outlet valve was opened, the film was taken out and the physical properties were measured. The film was not immersed in water.

Evaluation Example 6b: Measurement of Transmittance

The transmittance at 550 nm was measured using a haze meter NDH-5000W manufactured by Nippon Denshoku Kogyo.

Evaluation Example 7b: Measurement of Yellow Index

The yellow index (YI) was measured with a spectrophotometer (UltraScan PRO, Hunter Associates Laboratory) using a CIE colorimetric system.

Evaluation Example 8b: Measurement of Flexural Resistance

The number of folding was counted when the polymer film having a thickness of 50 μm was folded to have a radius of curvature of 3 mm and then unfolded (the number of folding counts one upon folding and unfolding). If it was not fractured upon repeated folding of 100,000 times, it was indicated as ○. If fractured before repeated folding of 100,000 times, it was indicated as x. The number of folding times was counted using the U-shape folding equipment of YUASA.

TABLE 21

| | | | Ex. 1b | Ex. 2b | Ex. 3b | Ex. 4b | Ex. 5b | Ex. 6b | C. Ex. 1b | C. Ex. 2b | C. Ex. 3b |
|---|---|---|---|---|---|---|---|---|---|---|---|
| Composition | Diamine | | TFMB 100 | TFMB 80 ODA 20 | TFMB 65 ODA 35 | TFMB 100 | TFMB 80 ODA 20 | TFMB 100 | TFMB 100 | TFMB 80 ODA 20 | TFMB 65 ODA 35 |
| | Dianhydride | | BTDA 10 | 6FDA 15 | 6FDA 7 | BTDA 10 | 6FDA 15 | 6FDA 10 | 6FDA 90 | 6FDA 80 | 6FDA 60 BPDA 40 |
| | Dicarbonyl compound | | TPC 60 IPC 30 | TPC 55 IPC 30 | TPC 50 IPC 43 | TPC 60 IPC 30 | TPC 55 IPC 30 | TPC 75 SD 15 | TPC 10 | TPC 20 | — |
| | Imide:amide | | 10:90 | 15:85 | 7:93 | 10:90 | 15:85 | 10:90 | 90:10 | 80:20 | 100:0 |
| Residual solvent in a film (ppm) | | | 150 | 340 | 300 | 100 | 1250 | 1420 | 80 | 100 | 750 |
| | IS value | | 25 | 49 | 37 | 20 | 140 | 152 | 98 | 90 | 175 |
| Tensile strength ($TS_0$) | | kgf/mm² | 21 | 24 | 25 | 21 | 24 | 27 | 25 | 27 | 22 |
| Elongation at break ($EL_0$) | | % | 20 | 21 | 20 | 20 | 21 | 18 | 20 | 30 | 24 |
| Modulus ($MO_0$) | | GPa | 6.3 | 7.2 | 5.6 | 6.3 | 7.2 | 7.1 | 4.8 | 6.2 | 7.2 |
| After autoclave treatment (24 hr) | Tensile strength ($TS_{24}$) | kgf/mm² | 20 | 22 | 20 | 22 | 25 | 26 | 25 | 22 | 15 |
| | $\Delta TS_{24}$ | % | 4.76 | 8.33 | 4.76 | 8.33 | 0 | 3.70 | 0 | 18.52 | 31.82 |
| | Elongation at break ($EL_{24}$) | | 25 | 20 | 25 | 20 | 18 | 17 | 20 | 18 | 16 |
| | $\Delta EL_{24}$ | % | 25 | 4.76 | 25 | 4.76 | 10 | 5.56 | 0 | 40 | 33.33 |
| | Modulus ($MO_{24}$) | GPa | 6.1 | 6.5 | 6.1 | 6.5 | 5.1 | 6.5 | 4.2 | 5.9 | 6.5 |
| | $\Delta MO_{24}$ | % | 3.17 | 9.72 | 3.17 | 9.72 | 8.93 | 8.45 | 12.5 | 4.84 | 9.72 |
| | $\Delta SUM_{24}$ | | 32.94 | 22.82 | 32.94 | 22.82 | 18.93 | 17.71 | 12.5 | 63.36 | 74.87 |
| After autoclave treatment (72 hr) | Tensile strength ($TS_{72}$) | kgf/mm² | 16 | 22 | 9 | 22 | 24 | 26 | 19 | 11 | 8 |
| | $\Delta TS_{72}$ | % | 23.81 | 8.33 | 57.14 | 8.33 | 4 | 3.7 | 24 | 59.26 | 63.64 |
| | Elongation at break ($EL_{72}$) | | 27 | 17 | 12 | 17 | 20 | 17 | 8 | 15 | 6 |
| | $\Delta EL_{72}$ | % | 35 | 19.05 | 40 | 19.05 | 0 | 5.56 | 60 | 50 | 75 |
| | Modulus ($MO_{72}$) | GPa | 5.1 | 5.9 | 2.6 | 5 | 4.6 | 6.1 | 3 | 3.5 | 3.4 |
| | $\Delta MO_{72}$ | % | 19.05 | 18.06 | 58.73 | 30.56 | 17.86 | 14.08 | 37.5 | 43.55 | 52.78 |
| | $\Delta SUM_{72}$ | | 77.86 | 45.44 | 155.87 | 57.94 | 21.86 | 23.34 | 121.5 | 152.81 | 191.41 |

TABLE 21-continued

|  |  | Ex. 1b | Ex. 2b | Ex. 3b | Ex. 4b | Ex. 5b | Ex. 6b | C. Ex. 1b | C. Ex. 2b | C. Ex. 3b |
|---|---|---|---|---|---|---|---|---|---|---|
| Light transmittance | % | 89 | 89.2 | 88.7 | 89 | 89.2 | 90.1 | 89.5 | 90.3 | 88.1 |
| YI | — | 3.8 | 2.7 | 3.2 | 3.8 | 5.6 | 3 | 2.6 | 3.5 | 4.2 |
| Process | 80° C. (min) | 20 | 15 | 15 | 10 | 8 | 15 | 15 | 15 | 15 |
|  | 270° C. (min) | 30 | 30 | 30 | 15 | 12 | 30 | 25 | 30 | 15 |
| Flexural resistance | 3R, 100K | ○ | ○ | ○ | ○ | ○ | ○ | × | × | × |

As can be seen from Table 2 above, when the polymer films of Examples 1b to 6b were subjected to repeated folding to a radius of curvature of 3 mm, the number of folding before fracture was 100,000 or more.

In addition, the polymer films of Examples 1b to 6b were excellent in yellow index and transmittance, let alone the excellent folding characteristics.

Further, the polymer films of Examples 1b to 6b had high mechanical properties such as tensile strength, elongation at break, and modulus and maintained excellent mechanical properties even after the treatment under the severe conditions of high temperature and high humidity for a certain period of time.

Example 1c

A 1-liter glass reactor equipped with a temperature-controllable double jacket was charged with dimethylacetamide (DMAc) as an organic solvent at 20° C. under a nitrogen atmosphere. Then, 2,2'-bis(trifluoromethyl)-4,4'-diaminobiphenyl (TFMB) was slowly added thereto for dissolution thereof. Subsequently, 2,2'-bis(3,4-dicarboxyphenyl)hexafluoropropane dianhydride (6FDA) was slowly added thereto, and the mixture was stirred for 1 hour. Then, terephthaloyl chloride (TPC) was added, followed by stirring thereof for 2 hours.

Subsequently, pyridine as a catalyst and acetic anhydride as a dehydrating agent were added to the polymer solution. In addition, butanoic acid as a pH adjusting agent was added, followed by stirring for 2 hours to prepare a polymer solution.

The polymer solution thus obtained was coated onto a glass plate and then dried with hot air at 80° C. for 30 minutes. The gel-sheet was then dried in a temperature range of 80° C. to 300° C. at a temperature elevation rate of 2° C./min to obtain a polymer film having a thickness of 50 μm.

As to the contents of the diamine compound (TFMB), dianhydride compound (6FDA), and the dicarbonyl compound (TPC), the number of moles thereof is shown in Table 3.

In addition, the contents of the catalyst (pyridine) and butanoic acid added were converted based on the total weight of the polymer solution and are shown in Table 3.

Examples 2c to 5c and Comparative Examples 1c to 3c

Films were prepared in the same manner as in Example 1c, except that the types and contents of the respective reactants and the like were changed as shown in Table 3 below. In addition, butanoic acid was not added in Comparative Examples 1c to 3c.

The films prepared in Examples 1c to 5c and Comparative Examples 1c to 3c were each measured and evaluated for the following properties. The results are shown in Table 3 below.

Evaluation Example 1c: Measurement of the Content of Butanoic Acid in a Film

The TD-GC MS analysis was used to measure the content of butanoic acid in a film. Specifically, 0.02 g of a film sample was loaded into a sample tube, which was heated from 25° C. to 300° C. at a rate of 10° C./min. The gas generated as the temperature was raised was adsorbed to the adsorption tube (Tenax), which was instantaneously heated (desorbed) and separated into each component by gas chromatography. The separated components were detected on a mass spectrometer and analyzed for the type and content of the components in the chromatogram obtained.

The content of butanoic acid was measured in ppm based on the total weight of the film. The results are shown in Table 3 below.

Evaluation Example 2c: Evaluation of Deformation Angle (Static Flexural Test)

The polymer film having a width of 20 mm, a length of 150 mm, and a thickness of 50 μm was folded to have a radius of curvature of 2 mm, which was then left at 25° C. for 24 hours, and the force applied to the film was released. Then, the inner angle of the film was measured.

Evaluation Example 3c: Evaluation of Folding

The film having a thickness of 50 μm was subjected to repeated folding to have a radius of curvature of 2 mm and then unfolded (the number of folding counts one upon folding and unfolding). The folding speed was 60 rpm. If it was not fractured upon repeated folding of 200,000 times, it was indicated as Pass. If fractured before repeated folding of 200,000 times, it was indicated as Fail. The number of folding times was counted using the U-shape folding equipment of YUASA.

Evaluation Example 4c: Measurement of Transmittance

The transmittance at 550 nm was measured using a haze meter NDH-5000W manufactured by Nippon Denshoku Kogyo.

Evaluation Example 5c: Measurement of Yellow Index

The yellow Index (YI) was measured with a spectrophotometer (UltraScan PRO, Hunter Associates Laboratory) using a CIE colorimetric system.

Evaluation Example 6c: Measurement of Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain on the stress-strain curve was taken as the modulus (GPa).

REFERENCE NUMERALS OF THE DRAWINGS

10: polymerization apparatus
20: tank
30: belt
40: thermosetting device
50: winder
100: polymer film
101: first side
102: second side
200: functional layer

TABLE 31

| | Ex. 1c | Ex. 2c | Ex. 3c | Ex. 4c | Ex. 5c | C. Ex. 1c | C. Ex. 2c | C. Ex. 3c |
|---|---|---|---|---|---|---|---|---|
| Diamine compound (mole) | TFMB 0.2 | TFMB 0.2 | TFMB 0.2 | TFMB 0.2 | TFMB 0.2 | TFMB 0.2 | TFMB 0.2 | TFMB 0.2 |
| Dianhydride compound (mole) | 6FDA 0.1 | 6FDA 0.2 | 6FPA 0.15 BPDA 0.05 | 6FDA 0.05 CBDA 0.1 | 6FDA 0.04 | 6FDA 0.1 | 6FDA 0.15 BPDA 0.05 | 6FDA 0.1 |
| Dicarbonyl compound (mole) | TPC 0.1 | — | — | TPC 0.05 | TPC 0.11 IPC 0.05 | TPC 0.1 | — | TPC 0.05 IPC 0.05 |
| Imide:amide (molar ratio) | 50:50 | 100:0 | 100:0 | 75:25 | 20:80 | 50:50 | 100:0 | 50:50 |
| Thickness (μm) | 50 | 50 | 50 | 50 | 50 | 50 | 50 | 50 |
| Catalyst (% by weight) | Pyridine 0.04 | Pyridine 0.06 | Pyridine 0.06 | Pyridine 0.06 | Pyridine 0.06 | Pyridine 0.04 | Pyridine 0.04 | Pyridine 0.04 |
| Butanoic acid (% by weight) | 0.2. | 0.1 | 0.05 | 0.12 | 0.3 | — | — | — |
| Content of butanoic acid in a film (ppm) | 201 | 97 | 60 | 130 | 250 | — | — | — |
| Transmittance (%) | 89.1 | 89.5 | 88.8 | 88.9 | 89.1 | 89.1 | 88.7 | 88.5 |
| YI | 2.5 | 1 | 3.5 | 3.2 | 2.8 | 3.7 | 4.6 | 3.5 |
| Modulus (GPa) | 6 | 4.5 | 5.6 | 6.6 | 7.1 | 5.1 | 4.8 | 4.7 |
| Deformation angle (24 hr, 2R) | 160 | 165 | 165 | 135 | 155 | 110 | 115 | 110 |
| Folding evaluation (2R) | Pass | Pass | Pass | Pass | Pass | Fail | Fail | Fail |

As can be seen from Table 3 above, the polymer films of Examples 1c to 5c had butanoic acid remaining therein. Thus, they were excellent in the restorability when they had been folded for a long period of time and then returned to the unfolded state. Specifically, the polymer films of Examples 1c to 5c had a deformation angle of 120° or more in the static flexural test, whereas the polymer films of Comparative Examples 1c to 3c had a deformation angle of 115° or less, showing poor results in the static flexural test.

In addition, when the polymer films of Examples 1c to 5c were subjected to repeated folding to a radius of curvature of 2 mm, the number of folding before the fracture was 200,000 or more. Thus, they are suitable for application to a foldable display, a flexible display, a rollable display, and the like. In contrast, the polymer films of Comparative Examples 1c to 3c were fractured before the number of folding of 200,000 in the folding test.

Further, the polymer films of Examples 1c to 5c maintained excellent mechanical properties such as static flexural characteristics, folding characteristics, and modulus and optical properties such as transmittance and yellow index.

300: front panel
400: display unit
500: adhesive layer

The invention claimed is:

1. A polymer film, which comprises a polymer resin selected from the group consisting of a polyamide-based resin and a polyimide-based resin, and which has a haze ($HZ_0$) of 3% or less before autoclave treatment and a $\Delta HZ_{24}$ value represented by the following Equation 1a of 500% or less:

$$\Delta HZ_{24}(\%) = \frac{|HZ_{24} - HZ_0|}{HZ_0} \times 100, \quad \text{Equation 1a}$$

wherein in Equation 1a,
$HZ_0$ refers to the haze before the film is treated in an autoclave, and
$HZ_{24}$ refers to the haze after the film is treated in an autoclave, and the autoclave treatment means that an autoclave is filled with water and a film is treated therein at a temperature of 120° C. and a pressure of 1.2 atm for 24 hours, wherein a content of a residual solvent in the film is 1,200 ppm or less, and wherein an IS value represented by the following Equation 7 is 5 to 160:

$$IS = IM + \frac{RS}{10} \qquad \text{[Equation 7]}$$

wherein in Equation 7, IM stands for the number of moles of imide repeat units when the total number of moles of the imide repeat units and amide repeat units in the film is 100; and RS stands for the content (ppm) of a residual solvent in the film.

2. The polymer film of claim 1, which has a yellow index ($YI_0$) before the autoclave treatment of 3 or less, and an in-plane retardation ($Ro_0$) before the autoclave treatment of 180 nm or less.

3. The polymer film of claim 1, which has a $\Delta YI_{24}$ value represented by the following Equation 2a of 30% or less, and a $\Delta Ro_{24}$ value represented by the following Equation 3a of 8% or less:

$$\Delta YI_{24}(\%) = \frac{|YI_{24} - YI_0|}{YI_0} \times 100 \qquad \text{Equation 2a}$$

$$\Delta Ro_{24}(\%) = \frac{|Ro_{24} - Ro_0|}{Ro_0} \times 100 \qquad \text{Equation 3a}$$

wherein in Equation 2a,
$YI_0$ refers to the yellow index before the film is treated in an autoclave, and
$YI_{24}$ refers to the yellow index after the film is treated in an autoclave,
wherein in Equation 3a,
$Ro_0$ refers to the in-plane retardation before the film is treated in an autoclave,
$Ro_{24}$ refers to the in-plane retardation after the film is treated in an autoclave,
and the autoclave treatment means that an autoclave is filled with water and a film is treated therein at a temperature of 120° C. and a pressure of 1.2 atm for 24 hours.

4. The polymer film of claim 1, which further comprises butanoic acid.

5. The polymer film of claim 1, wherein the polymer resin comprises an imide-based repeat unit and an amide-based repeat unit at a molar ratio of 2:98 to 50:50.

6. The polymer film of claim 1, which has a transmittance of 80% or more, a yellow index of 5 or less, and a modulus of 4.0 GPa or more.

7. A polymer film, which comprises a polymer resin, and which has a modulus ($MO_0$) before autoclave treatment of 5.0 GPa or more, and a $\Delta TS_{24}$ value represented by the following Equation 1 b of 15% or less:

$$\Delta TS_{24}(\%) = \frac{|TS_{24} - TS_0|}{TS_0} \times 100 \qquad \text{[Equation 1b]}$$

wherein in Equation 1b,
$TS_0$ refers to the modulus before the film is treated in an autoclave, and
$TS_{24}$ refers to the modulus after the film is treated in an autoclave, and the autoclave treatment means that an autoclave is filled with water and a film is treated therein at a temperature of 120° C. and a pressure of 1.2 atm for 24 hours, wherein a content of a residual solvent in the film is 1,200 ppm or less, wherein an IS value represented by the following Equation 7 is 5 to 160:

$$IS = IM + \frac{RS}{10} \qquad \text{[Equation 7]}$$

wherein in Equation 7, IM stands for the number of moles of imide repeat units when the total number of moles of the imide repeat units and amide repeat units in the film is 100; and RS stands for the content (ppm) of a residual solvent in the film, wherein the polymer resin comprises repeat units represented by the following Formula A and repeat units represented by the following Formula B, and wherein a molar ratio of repeat units represented by the following formula A and repeat units represented by the following Formula B is 2:98 to 15:85:

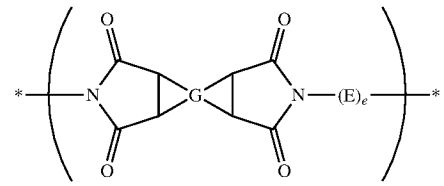

Formula A

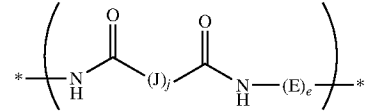

Formula B wherein in Formulae A and B,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

8. The polymer film of claim 7, which has a tensile strength ($TS_0$) before the autoclave treatment of 20 kgf/mm$^2$ or more, and an elongation at break ($EL_0$) before the autoclave treatment of 15% or more.

9. The polymer film of claim 7, which has a $\Delta TS_{72}$ value represented by the following Equation 4b of 30% or less:

$$\Delta TS_{72}(\%) = \frac{|TS_{72} - TS_0|}{TS_0} \times 100 \qquad \text{[Equation 4b]}$$

wherein in Equation 4b,
$TS_0$ refers to the modulus before the film is treated in an autoclave,
$TS_{72}$ refers to the modulus after the film is treated in an autoclave, and the autoclave treatment means that an autoclave is filled with water and a film is treated therein at a temperature of 120° C. and a pressure of 1.2 atm for 72 hours.

10. The polymer film of claim 7, wherein the content of a residual solvent in the film is 1,000 ppm or less.

11. The polymer film of claim 7, which has a $\Delta HZ_{24}$ value represented by the following Equation 1a of 500% or less, a $\Delta YI_{24}$ value represented by the following Equation 2a of 30% or less, and a $\Delta Ro_{24}$ value represented by the following Equation 3a of 8% or less:

$$\Delta HZ_{24}(\%) = \frac{|HZ_{24} - HZ_0|}{HZ_0} \times 100 \qquad \text{[Equation 1a]}$$

$$\Delta YI_{24}(\%) = \frac{|YI_{24} - YI_0|}{YI_0} \times 100 \qquad \text{[Equation 2a]}$$

$$\Delta Ro_{24}(\%) = \frac{|Ro_{24} - Ro_0|}{Ro_0} \times 100 \qquad \text{[Equation 3a]}$$

wherein in Equations 1a, 2a, and 3a,
$HZ_0$ refers to the haze before the film is treated in an autoclave,
$HZ_{24}$ refers to the haze after the film is treated in an autoclave,
$YI_0$ refers to the yellow index before the film is treated in an autoclave,
$YI_{24}$ refers to the yellow index after the film is treated in an autoclave,
$Ro_0$ refers to the in-plane retardation before the film is treated in an autoclave,
$Ro_{24}$ refers to the in-plane retardation after the film is treated in an autoclave, and
the autoclave treatment means that an autoclave is filled with water and a film is treated therein at a temperature of 120° C. and a pressure of 1.2 atm for 24 hours.

12. A polymer film, which comprises a polymer resin selected from the group consisting of a polyamide-based resin and a polyimide-based resin; and butanoic acid,
wherein butanoic acid is contained in an amount of 1 ppm to 1,000 ppm, based on the total weight of the polymer film, and
wherein the IS value represented by the following Equation 7 is 5 to 160:

$$IS = IM + \frac{RS}{10} \qquad \text{Equation 7}$$

wherein in Equation 7, IM stands for the number of moles of imide repeat units when the total number of moles of the imide repeat units and amide repeat units in the film is 100; and RS stands for the content (ppm) of a residual solvent in the film.

13. The polymer film of claim 12, wherein when the polymer film having a thickness of 50 µm is folded to have a radius of curvature of 2 mm, which is then left at 25° C. for 24 hours, and the force applied to the film is released, the inner angle of the film is 120° or more.

14. The polymer film of claim 12, wherein when the polymer film is folded to have a radius of curvature of 2 mm, the number of folding repeats before the fracture is 200,000 or more.

* * * * *